(12) United States Patent
Hayashi et al.

(10) Patent No.: US 12,206,093 B2
(45) Date of Patent: Jan. 21, 2025

(54) POSITIVE ELECTRODE LAYER FOR ALL-SOLID-STATE BATTERY, MANUFACTURING METHOD OF POSITIVE ELECTRODE LAYER FOR ALL-SOLID-STATE BATTERY, AND ALL-SOLID-STATE BATTERY

(71) Applicant: DENSO CORPORATION, Kariya (JP)

(72) Inventors: Naohiro Hayashi, Kariya (JP); Keita Takahashi, Kariya (JP); Hitoshi Onodera, Kariya (JP)

(73) Assignee: DENSO CORPORATION, Kariya (JP)

( * ) Notice: Subject to any disclaimer, the term of this patent is extended or adjusted under 35 U.S.C. 154(b) by 358 days.

(21) Appl. No.: 17/453,873

(22) Filed: Nov. 8, 2021

(65) Prior Publication Data

US 2022/0158172 A1    May 19, 2022

(30) Foreign Application Priority Data

Nov. 13, 2020  (JP) .................................. 2020-189579

(51) Int. Cl.
*H01M 4/36* (2006.01)
*H01M 4/02* (2006.01)
(Continued)

(52) U.S. Cl.
CPC ......... *H01M 4/362* (2013.01); *H01M 4/0471* (2013.01); *H01M 4/382* (2013.01); *H01M 4/62* (2013.01); *H01M 10/0525* (2013.01); *H01M 10/0562* (2013.01); *H01M 10/0585* (2013.01); *H01M 2004/028* (2013.01); *H01M 2300/0071* (2013.01)

(58) Field of Classification Search
USPC ........................................................ 429/320
See application file for complete search history.

(56) References Cited

U.S. PATENT DOCUMENTS

2001/0020927 A1* 9/2001 Ikawa .................... H01M 4/383
345/87
2016/0133990 A1* 5/2016 Schwanz ........... H01M 10/0562
429/189
(Continued)

FOREIGN PATENT DOCUMENTS

| JP | 2017168396 A | * | 9/2017 | ........... C04B 35/462 |
| KR | 20160091657 A | * | 8/2016 | |
| WO | WO-2019044903 A1 | | 3/2019 | |

OTHER PUBLICATIONS

Shen, Preparation and characterization of Ga and Sr co-doped Li7La3Zr2O12 garnet-type solid electrolyte, Jun. 21, 2019, Solid State Ionics 339, pp. 1-5 (Year: 2019).*

*Primary Examiner* — Christian Roldan
*Assistant Examiner* — Robert Gene West
(74) *Attorney, Agent, or Firm* — Harness, Dickey & Pierce, P.L.C.

(57) ABSTRACT

A positive electrode layer for an all-solid-state battery, includes a first phase including a positive electrode active material containing Li, a second phase including a garnet-type solid electrolyte containing Li, Bi, M2, and O, and a third phase different from the first phase and the second phase. The third phase includes a Li—Bi-M2-O-based compound containing Li, Bi, M2, and O, and M2 is at least one element selected from the group consisting of Ca, Sr, Ba, Mg, Y, and Rb.

8 Claims, 25 Drawing Sheets

(51) Int. Cl.
  *H01M 4/04* (2006.01)
  *H01M 4/38* (2006.01)
  *H01M 4/62* (2006.01)
  *H01M 10/0525* (2010.01)
  *H01M 10/0562* (2010.01)
  *H01M 10/0585* (2010.01)

(56) References Cited

U.S. PATENT DOCUMENTS

2018/0090758 A1* 3/2018 Xu .................. H01M 4/485
2019/0084887 A1* 3/2019 Yamamoto ............ C04B 35/634
2020/0112056 A1 4/2020 Takano et al.
2020/0369574 A1 11/2020 Yamamoto et al.
2020/0373609 A1* 11/2020 Yashiro .................. H01M 4/38

* cited by examiner 212a, 212     211a, 211    R

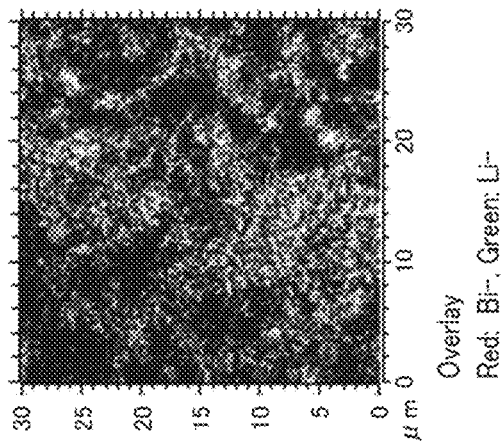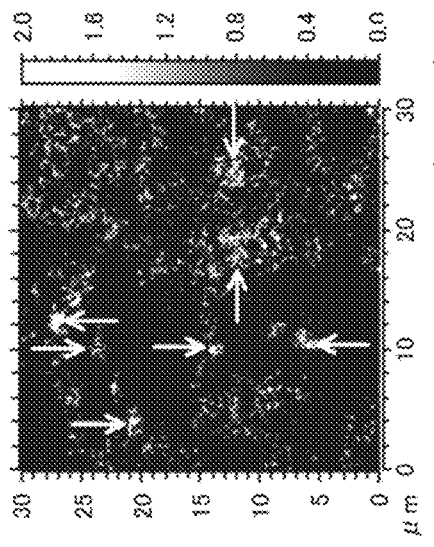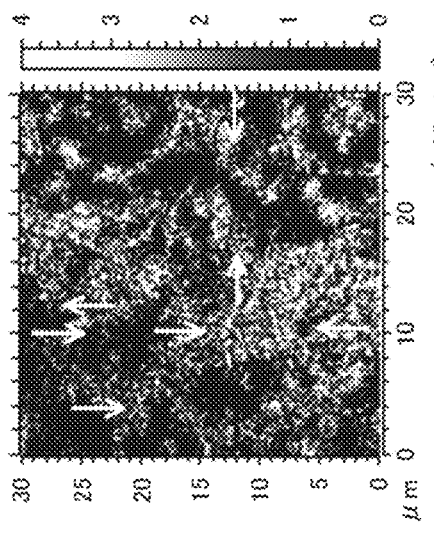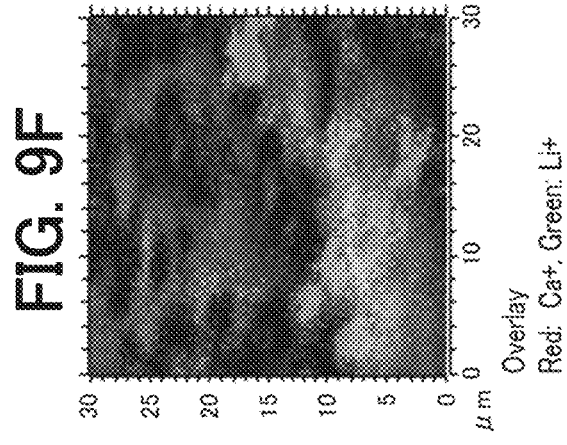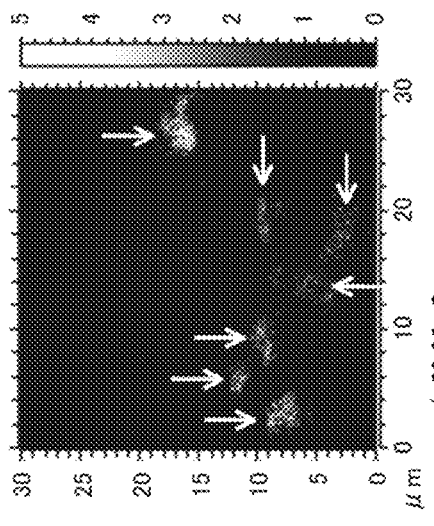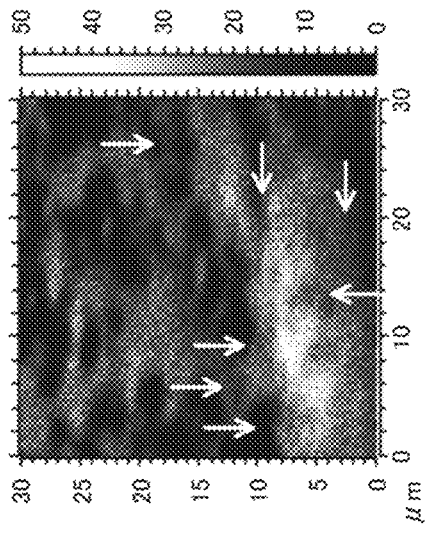

SEM IMAGE

B MAP 213a, 213
Bi MAP

Co MAP

Zr MAP 213b, 213
Ca MAP

FIG. 25

| SAMPLE NAME | FIRST PHASE (POSITIVE ELECTRODE ACTIVE MATERIAL) | SECOND PHASE (SOLID ELECTROLYTE) | | | | | | THIRD PHASE | SIN AID | TEMP (°C) | CHARGE CAPACITY (mAh/g) | DISCHARGE CAPACITY (mAh/g) | CONDUCTIVITY (S/cm) | RELATIVE DENSITY (%) |
|---|---|---|---|---|---|---|---|---|---|---|---|---|---|---|
| | | $Li_{6.5}La_{2.92}Ca_{0.08}Zr_{1.42}Bi_{0.58}O_{12}$ | | | | | | | | | | | | |
| | | M1 | x | M2 | y | M3 | z | | | | | | | |
| SAMPLE 1 | $LiCoO_2$ | w/o | 0 | Ca | 2.92 | w/o | 0.08 | Li-Bi-M2-O-BASED COMPOUND w/ Li-M2-B-O-BASED COMPOUND w/o | w/o | 850 | 119.8 | 85.8 | $2.73 \times 10^{-4}$ | 80 |
| | | M1 | x | M2 | y | M3 | z | | | | | | | |
| SAMPLE 2 | $LiCoO_2$ | w/o | 0 | Ca | 2.92 | w/o | 0.08 | Li-Bi-M2-O-BASED COMPOUND w/ Li-M2-B-O-BASED COMPOUND w/o | $Li_3BO_3$ | 800 | 123.5 | 94.9 | $5.63 \times 10^{-4}$ | 88 |
| | | $Li_{6.42}La_3Zr_{1.42}Bi_{0.58}O_{12}$ | | | | | | | | | | | | |
| | | M1 | x | M2 | y | M3 | z | | | | | | | |
| SAMPLE 1C | $LiCoO_2$ | w/o | 0 | w/o | 3 | w/o | 0.58 | Li-Bi-M2-O-BASED COMPOUND w/ Li-M2-B-O-BASED COMPOUND w/o | w/o | 850 | 79.3 | 49.3 | $5.50 \times 10^{-5}$ | 75 |
| | | M1 | x | M2 | y | M3 | z | | | | | | | |
| SAMPLE 2C | $LiCoO_2$ | w/o | 0 | w/o | 3 | w/o | 0.58 | Li-Bi-M2-O-BASED COMPOUND w/ Li-M2-B-O-BASED COMPOUND w/o | $Li_3BO_3$ | 800 | 75.6 | 45.7 | $5.00 \times 10^{-5}$ | 70 |

FIG. 26

| SAMPLE NAME | FIRST PHASE (POSITIVE ELECTRODE ACTIVE MATERIAL) | SECOND PHASE (SOLID ELECTROLYTE) | | | | | | | | THIRD PHASE | SIN AID | TEMP (°C) | CONDUC-TIVITY (S/cm) | RELATIVE DENSITY (%) |
|---|---|---|---|---|---|---|---|---|---|---|---|---|---|---|
| | | formula | M1 | x | h | M2 | y | z | M3 | g | | | | |
| SAMPLE 3 | $LiCoO_2$ | $Li_{6.5}La_{2.92}Sr_{0.08}Zr_{1.42}Bi_{0.58}O_{12}$ | w/o | 0 | 2.92 | Sr | 0.08 | 0.58 | w/o | w/o | $Li$-$Bi$-$M2$-$O$-BASED COMPOUND w/<br>$Li$-$M2$-$B$-$O$-BASED COMPOUND w/ | $Li_3BO_3$ | 800 | $4.5 \times 10^{-4}$ | 85 |
| SAMPLE 4 | $LiCoO_2$ | $Li_{6.5}La_{2.92}Ba_{0.08}Zr_{1.42}Bi_{0.58}O_{12}$ | w/o | 0 | 2.92 | Ba | 0.08 | 0.58 | w/o | w/o | $Li$-$Bi$-$M2$-$O$-BASED COMPOUND w/<br>$Li$-$M2$-$B$-$O$-BASED COMPOUND w/ | $Li_3BO_3$ | 800 | $5.2 \times 10^{-4}$ | 86 |
| SAMPLE 5 | $LiCoO_2$ | $Li_{6.5}La_{2.92}Mg_{0.08}Zr_{1.42}Bi_{0.58}O_{12}$ | w/o | 0 | 2.92 | Mg | 0.08 | 0.58 | w/o | w/o | $Li$-$Bi$-$M2$-$O$-BASED COMPOUND w/<br>$Li$-$M2$-$B$-$O$-BASED COMPOUND w/ | $Li_3BO_3$ | 800 | $9.5 \times 10^{-5}$ | 76 |
| SAMPLE 6 | $LiCoO_2$ | $Li_{6.42}La_{2.92}Y_{0.08}Zr_{1.42}Bi_{0.58}O_{12}$ | w/o | 0 | 2.92 | Y | 0.08 | 0.58 | w/o | w/o | $Li$-$Bi$-$M2$-$O$-BASED COMPOUND w/<br>$Li$-$M2$-$B$-$O$-BASED COMPOUND w/ | $Li_3BO_3$ | 800 | $1.8 \times 10^{-4}$ | 78 |
| SAMPLE 7 | $LiCoO_2$ | $Li_{6.58}La_{2.92}Rb_{0.08}Zr_{1.42}Bi_{0.58}O_{12}$ | w/o | 0 | 2.92 | Rb | 0.08 | 0.58 | w/o | w/o | $Li$-$Bi$-$M2$-$O$-BASED COMPOUND w/<br>$Li$-$M2$-$B$-$O$-BASED COMPOUND w/ | $Li_3BO_3$ | 800 | $9.7 \times 10^{-5}$ | 78 |

FIG. 27

| SAMPLE NAME | FIRST PHASE (POSITIVE ELECTRODE ACTIVE MATERIAL) | SECOND PHASE (SOLID ELECTROLYTE) | | | | | | | | THIRD PHASE | | SIN AID | TEMP (°C) | CONDUC- TIVITY (S/cm) | RELATIVE DENSITY (%) |
|---|---|---|---|---|---|---|---|---|---|---|---|---|---|---|---|
| | | $Li_{6.5}La_{2.98}Ca_{0.02}Zr_{1.48}Bi_{0.52}O_{12}$ | | | | | | | | | | | | | |
| | | M1 | x | h | M2 | y | z | M3 | g | Li-Bi-M2-O-BASED COMPOUND | W/ | | | | |
| SAMPLE 8 | $LiCoO_2$ | W/O | 0 | 2.98 | Ca | 0.02 | 0.52 | W/O | O | Li-M2-B-O-BASED COMPOUND | W/ | $Li_3BO_3$ | 800 | $2.3 \times 10^{-4}$ | 76.5 |
| | | $Li_{6.5}La_{2.96}Ca_{0.04}Zr_{1.46}Bi_{0.54}O_{12}$ | | | | | | | | | | | | | |
| | | M1 | x | h | M2 | y | z | M3 | g | Li-Bi-M2-O-BASED COMPOUND | W/ | | | | |
| SAMPLE 9 | $LiCoO_2$ | W/O | 0 | 2.96 | Ca | 0.04 | 0.54 | W/O | O | Li-M2-B-O-BASED COMPOUND | W/ | $Li_3BO_3$ | 800 | $3.0 \times 10^{-4}$ | 79.95 |
| | | $Li_{6.5}La_{2.94}Ca_{0.06}Zr_{1.44}Bi_{0.56}O_{12}$ | | | | | | | | | | | | | |
| | | M1 | x | h | M2 | y | z | M3 | g | Li-Bi-M2-O-BASED COMPOUND | W/ | | | | |
| SAMPLE 10 | $LiCoO_2$ | W/O | 0 | 2.94 | Ca | 0.06 | 0.56 | W/O | O | Li-M2-B-O-BASED COMPOUND | W/ | $Li_3BO_3$ | 800 | $4.1 \times 10^{-4}$ | 83.87 |
| | | $Li_{6.5}La_{2.9}Ca_{0.1}Zr_{1.4}Bi_{0.6}O_{12}$ | | | | | | | | | | | | | |
| | | M1 | x | h | M2 | y | z | M3 | g | Li-Bi-M2-O-BASED COMPOUND | W/ | | | | |
| SAMPLE 11 | $LiCoO_2$ | W/O | 0 | 2.9 | Ca | 0.1 | 0.6 | W/O | O | Li-M2-B-O-BASED COMPOUND | W/ | $Li_3BO_3$ | 800 | $5.5 \times 10^{-4}$ | 85.3 |
| | | $Li_{6.5}La_{2.85}Ca_{0.15}Zr_{1.35}Bi_{0.65}O_{12}$ | | | | | | | | | | | | | |
| | | M1 | x | h | M2 | y | z | M3 | g | Li-Bi-M2-O-BASED COMPOUND | W/ | | | | |
| SAMPLE 12 | $LiCoO_2$ | W/O | 0 | 2.85 | Ca | 0.15 | 0.65 | W/O | O | Li-M2-B-O-BASED COMPOUND | W/ | $Li_3BO_3$ | 800 | $5.1 \times 10^{-4}$ | 81.51 |

FIG. 28

| SAMPLE NAME | FIRST PHASE (POSITIVE ELECTRODE ACTIVE MATERIAL) | SECOND PHASE (SOLID ELECTROLYTE) | | | | | | | THIRD PHASE | SIN AID | TEMP (°C) | CONDUCTIVITY (S/cm) | RELATIVE DENSITY (%) |
|---|---|---|---|---|---|---|---|---|---|---|---|---|---|
| | | $Li_{6.5}La_{2.8}Ca_{0.2}Zr_{1.3}Bi_{0.7}O_{12}$ | | | | | | | | | | | |
| | | M1 | x | h | M2 | y | z | M3 | | | | | |
| SAMPLE 13 | $LiCoO_2$ | W/O | 0 | 2.8 | Ca | 0.2 | 0.7 | W/O | Li-Bi-M2-O-BASED COMPOUND W/ Li-M2-B-O-BASED COMPOUND W/ | $Li_3BO_3$ | 800 | $5.0 \times 10^{-4}$ | 81.99 |
| | | $Li_{6.5}La_{2.7}Ca_{0.3}Zr_{1.2}Bi_{0.8}O_{12}$ | | | | | | | | | | | |
| | | M1 | x | h | M2 | y | z | M3 | | | | | |
| SAMPLE 14 | $LiCoO_2$ | W/O | 0 | 2.7 | Ca | 0.3 | 0.8 | W/O | Li-Bi-M2-O-BASED COMPOUND W/ Li-M2-B-O-BASED COMPOUND W/ | $Li_3BO_3$ | 800 | $2.8 \times 10^{-4}$ | 71.865 |
| | | $Li_{6.5}La_{2.6}Ca_{0.4}Zr_{1.1}Bi_{0.9}O_{12}$ | | | | | | | | | | | |
| | | M1 | x | h | M2 | y | z | M3 | | | | | |
| SAMPLE 15 | $LiCoO_2$ | W/O | 0 | 2.6 | Ca | 0.4 | 0.9 | W/O | Li-Bi-M2-O-BASED COMPOUND W/ Li-M2-B-O-BASED COMPOUND W/ | $Li_3BO_3$ | 800 | $3.0 \times 10^{-4}$ | 73.09 |
| | | $Li_{6.5}La_{2.5}Ca_{0.5}Zr_{1.0}Bi_{1.0}O_{12}$ | | | | | | | | | | | |
| | | M1 | x | h | M2 | y | z | M3 | | | | | |
| SAMPLE 16 | $LiCoO_2$ | W/O | 0 | 2.5 | Ca | 0.5 | 1.0 | W/O | Li-Bi-M2-O-BASED COMPOUND W/ Li-M2-B-O-BASED COMPOUND W/ | $Li_3BO_3$ | 800 | $5.2 \times 10^{-5}$ | 71.54 |
| | | $Li_{6.5}La_{2.4}Ca_{0.6}Zr_{1.0}Bi_{1.1}O_{12}$ | | | | | | | | | | | |
| | | M1 | x | h | M2 | y | z | M3 | | | | | |
| SAMPLE 17 | $LiCoO_2$ | W/O | 0 | 2.4 | Ca | 0.6 | 1.1 | W/O | Li-Bi-M2-O-BASED COMPOUND W/ Li-M2-B-O-BASED COMPOUND W/ | $Li_3BO_3$ | 800 | $2.8 \times 10^{-5}$ | 65 |

FIG. 29

| SAMPLE NAME | FIRST PHASE (POSITIVE ELECTRODE ACTIVE MATERIAL) | SECOND PHASE (SOLID ELECTROLYTE) | | | | | | | | THIRD PHASE | | SIN AID | TEMP (°C) | CONDUC-TIVITY (S/cm) | RELATIVE DENSITY (%) |
|---|---|---|---|---|---|---|---|---|---|---|---|---|---|---|---|
| | | $Li_{6.56}La_{2.92}Ca_{0.08}Zr_{1.48}Bi_{0.52}O_{12}$ | | | | | | | | | | | | | |
| | | M1 | x | h | M2 | y | Ca | z | M3 | g | Li-Bi-M2-O-BASED COMPOUND | w/ | | | |
| SAMPLE 18 | $LiCoO_2$ | W/O | 0 | 2.92 | Ca | 0.08 | | 0.52 | O | 0 | Li-M2-B-O-BASED COMPOUND | w/ | $Li_3BO_3$ | 800 | $5.63 \times 10^{-4}$ | 76.5 |
| | | $Li_{6.5}La_{2.85}Ca_{0.02}Zr_{1.48}Bi_{0.52}O_{12}$ | | | | | | | | | | | | | |
| | | M1 | x | h | M2 | y | Ca | z | M3 | g | Li-Bi-M2-O-BASED COMPOUND | w/ | | | |
| SAMPLE 19 | $LiCoO_2$ | W/O | 0 | 2.85 | Ca | 0.02 | | 0.52 | O | 0 | Li-M2-B-O-BASED COMPOUND | w/ | $Li_3BO_3$ | 800 | $5.9 \times 10^{-4}$ | 78.5 |
| | | $Li_{6.5}La_{2.82}Ca_{0.04}Zr_{1.46}Bi_{0.54}O_{12}$ | | | | | | | | | | | | | |
| | | M1 | x | LaOh | M2 | y | Ca | z | M3 | g | Li-Bi-M2-O-BASED COMPOUND | w/ | | | |
| SAMPLE 20 | $LiCoO_2$ | W/O | 0 | 2.82 | | 0.04 | | 0.54 | O | 0 | Li-M2-B-O-BASED COMPOUND | w/ | $Li_3BO_3$ | 800 | $5.8 \times 10^{-4}$ | 79.95 |
| | | $Li_{6.5}La_{2.75}Ca_{0.06}Zr_{1.46}Bi_{0.56}O_{12}$ | | | | | | | | | | | | | |
| | | M1 | x | h | M2 | y | Ca | z | M3 | g | Li-Bi-M2-O-BASED COMPOUND | w/ | | | |
| SAMPLE 21 | $LiCoO_2$ | W/O | 0 | 2.75 | Ca | 0.06 | | 0.56 | O | 0 | Li-M2-B-O-BASED COMPOUND | w/ | $Li_3BO_3$ | 800 | $5.7 \times 10^{-4}$ | 79.1 |
| | | $Li_{6.5}La_{2.72}Ca_{0.1}Zr_{1.4}Bi_{0.6}O_{12}$ | | | | | | | | | | | | | |
| | | M1 | x | h | M2 | y | Ca | z | M3 | g | Li-Bi-M2-O-BASED COMPOUND | w/ | | | |
| SAMPLE 22 | $LiCoO_2$ | W/O | 0 | 2.72 | Ca | 0.1 | | 0.6 | O | 0 | Li-M2-B-O-BASED COMPOUND | w/ | $Li_3BO_3$ | 800 | $5.3 \times 10^{-4}$ | 79 |

FIG. 30

| SAMPLE NAME | FIRST PHASE (POSITIVE ELECTRODE ACTIVE MATERIAL) | SECOND PHASE (SOLID ELECTROLYTE) | | | | | | | | THIRD PHASE | SIN AID | TEMP (°C) | CONDUC-TIVITY (S/cm) | RELATIVE DENSITY (%) |
|---|---|---|---|---|---|---|---|---|---|---|---|---|---|---|
| SAMPLE 3 | $LiCoO_2$ | $Li_{6.5}Al_{0.1}La_{2.7}Ca_{0.3}Zr_{1.5}Bi_{0.5}O_{12}$ | M1 | x | M2 | h | y | M3 | z | Li-Bi-M2-O-BASED COMPOUND W/ Li-M2-B-O-BASED COMPOUND W/O | $Li_3BO_3$ | 800 | $3.0 \times 10^{-4}$ | 75.6 |
| | | | Al | 0.1 | Ca | 2.7 | 0.3 | g | 0.5 | | | | | |
| SAMPLE 4 | $LiCoO_2$ | $Li_{6.5}Ga_{0.1}La_{2.7}Ca_{0.3}Zr_{1.5}Bi_{0.5}O_{12}$ | M1 | x | M2 | h | y | M3 | z | Li-Bi-M2-O-BASED COMPOUND W/ Li-M2-B-O-BASED COMPOUND W/O | $Li_3BO_3$ | 800 | $3.2 \times 10^{-4}$ | 77.3 |
| | | | Ga | 0.1 | Ca | 2.7 | 0.3 | g | 0.5 | | | | | |
| SAMPLE 5 | $LiCoO_2$ | $Li_{6.4}Ga_{0.15}La_{2.7}Ca_{0.3}Zr_{1.5}Bi_{0.45}O_{12}$ | M1 | x | M2 | h | y | M3 | z | Li-Bi-M2-O-BASED COMPOUND W/ Li-M2-B-O-BASED COMPOUND W/O | $Li_3BO_3$ | 800 | $4.2 \times 10^{-4}$ | 82.1 |
| | | | Ga | 0.15 | Ca | 2.7 | 0.3 | g | 0.45 | | | | | |
| SAMPLE 6 | $LiCoO_2$ | $Li_{6.3}Ga_{0.2}La_{2.7}Ca_{0.3}Zr_{1.6}Bi_{0.4}O_{12}$ | M1 | x | M2 | h | y | M3 | z | Li-Bi-M2-O-BASED COMPOUND W/ Li-M2-B-O-BASED COMPOUND W/O | $Li_3BO_3$ | 800 | $4.0 \times 10^{-4}$ | 83.6 |
| | | | Ga | 0.2 | Ca | 2.7 | 0.3 | g | 0.4 | | | | | |
| SAMPLE 7 | $LiCoO_2$ | $Li_{6.2}Ga_{0.25}La_{2.7}Ca_{0.3}Zr_{1.65}Bi_{0.35}O_{12}$ | M1 | x | M2 | h | y | M3 | z | Li-Bi-M2-O-BASED COMPOUND W/ Li-M2-B-O-BASED COMPOUND W/O | $Li_3BO_3$ | 800 | $2.9 \times 10^{-4}$ | 79.2 |
| | | | Ga | 0.25 | Ca | 2.7 | 0.3 | g | 0.35 | | | | | |
| SAMPLE 7 | $LiCoO_2$ | $Li_{6.1}Ga_{0.3}La_{2.7}Ca_{0.3}Zr_{1.65}Bi_{0.3}O_{12}$ | M1 | x | M2 | h | y | M3 | z | Li-Bi-M2-O-BASED COMPOUND W/ Li-M2-B-O-BASED COMPOUND W/O | $Li_3BO_3$ | 800 | $9.3 \times 10^{-5}$ | 76.3 |
| | | | Ga | 0.3 | Ca | 2.7 | 0.3 | g | 0.3 | | | | | |

FIG. 31

| SAMPLE NAME | FIRST PHASE (POSITIVE ELECTRODE ACTIVE MATERIAL) | SECOND PHASE (SOLID ELECTROLYTE) | | | | | | | | THIRD PHASE | SIN AID | TEMP (°C) | CHARGE CAPACITY (mAh/g) | DISCHARGE CAPACITY (mAh/g) | CONDUCTIVITY (S/cm) | RELATIVE DENSITY (%) |
|---|---|---|---|---|---|---|---|---|---|---|---|---|---|---|---|---|
| | | $Li_{6.5}La_{2.92}Ca_{0.08}Zr_{1.42}Bi_{0.58}O_{12}$ | | | | | | | | | | | | | | |
| | | M1 | x | h | M2 | y | z | M3 | g | | | | | | | |
| SAMPLE 29 | $LiCoO_2$ | w/o | 0 | 2.92 | Ca | 0.08 | 0.58 | w/o | 0 | Li-Bi-M2-O-BASED COMPOUND w/ Li-M2-B-O-BASED COMPOUND w/ | $Li_3BO_3$ | 750 | 121.8 | 95.6 | $6.2 \times 10^{-4}$ | 85 |
| SAMPLE 30 | $LiCoO_2$ | w/o | 0 | 2.92 | Ca | 0.08 | 0.58 | w/o | 0 | Li-Bi-M2-O-BASED COMPOUND w/ Li-M2-B-O-BASED COMPOUND w/ | $Li_3BO_3$ | 850 | 125.3 | 98.1 | $7.2 \times 10^{-4}$ | 99 |
| SAMPLE 31 | $LiCoO_2$ | w/o | 0 | 2.92 | Ca | 0.08 | 0.58 | w/o | 0 | Li-Bi-M2-O-BASED COMPOUND w/ Li-M2-B-O-BASED COMPOUND w/ | $Li_3BO_3$ | 900 | 111 | 85 | $2.0 \times 10^{-4}$ | 99 |
| SAMPLE 32 | $LiNi_{0.6}Mn_{0.2}Co_{0.2}O_2$ | w/o | 0 | 2.92 | Ca | 0.08 | 0.58 | w/o | 0 | Li-Bi-M2-O-BASED COMPOUND w/ Li-M2-B-O-BASED COMPOUND w/ | $Li_3BO_3$ | 750 | 128.3 | 99 | $3.5 \times 10^{-5}$ | 80 |
| SAMPLE 33 | $LiNi_{0.6}Mn_{0.2}Co_{0.2}O_2$ | w/o | 0 | 2.92 | Ca | 0.08 | 0.58 | w/o | 0 | Li-Bi-M2-O-BASED COMPOUND w/ Li-M2-B-O-BASED COMPOUND w/ | $Li_3BO_3$ | 800 | 129 | 96 | $4.2 \times 10^{-5}$ | 82 |
| SAMPLE 34 | $LiNi_{0.6}Mn_{0.2}Co_{0.2}O_2$ | w/o | 0 | 2.92 | Ca | 0.08 | 0.58 | w/o | 0 | Li-Bi-M2-O-BASED COMPOUND w/ Li-M2-B-O-BASED COMPOUND w/ | $Li_3BO_3$ | 850 | N/A | N/A | N/A | 94 |

POSITIVE ELECTRODE LAYER FOR ALL-SOLID-STATE BATTERY, MANUFACTURING METHOD OF POSITIVE ELECTRODE LAYER FOR ALL-SOLID-STATE BATTERY, AND ALL-SOLID-STATE BATTERY

CROSS REFERENCE TO RELATED APPLICATION

The present application claims the benefit of priority from Japanese Patent Application No. 2020-189579 filed on Nov. 13, 2020. The entire disclosure of the above application is incorporated herein by reference.

TECHNICAL FIELD

The present disclosure relates to a positive electrode layer for an all-solid-state battery, a manufacturing method of a positive electrode layer for an all-solid-state battery, and an all-solid-state battery.

BACKGROUND

In general, an all-solid-state battery includes a cell having a separator layer, a positive electrode layer, and a negative electrode layer. The separator layer includes a solid electrolyte. The positive electrode layer is disposed on one surface of the separator layer and includes a positive electrode active material and a solid electrolyte. The negative electrode layer includes a negative electrode active material and a solid electrolyte.

SUMMARY

A positive electrode layer for an all-solid-state battery according to an aspect of the present disclosure includes a first phase including a positive electrode active material containing Li, a second phase including a garnet-type solid electrolyte containing Li, Bi, M2, and O; and a third phase different from the first phase and the second phase. The third phase includes a Li—Bi-M2-O-based compound containing Li, Bi, M2, and O, and M2 is at least one element selected from the group consisting of Ca, Sr, Ba, Mg, Y, and Rb. An all-solid-state battery according to another aspect includes the positive electrode layer. The positive electrode layer can be manufactured by sintering a positive electrode forming material at a sintering temperature less than 900° C.

BRIEF DESCRIPTION OF DRAWINGS

Objects, features and advantages of the present disclosure will become apparent from the following detailed description made with reference to the accompanying drawings. In the drawings:

FIG. 9A to FIG. 9F are diagrams showing results of analysis by a time-of-flight secondary ion mass spectrometry (TOF-SIMS) of the cross sectional portion of the positive electrode layer of Sample 1;

FIG. 25 is a diagram showing components, manufacturing conditions, and measurement results of Sample 1, Sample 2, Sample 1C, and Sample 2C in the experimental examples;

FIG. 26 is a diagram showing components, manufacturing conditions, and measurement results of Samples 3 to 7 in the experimental examples;

FIG. 27 is a diagram showing components, manufacturing conditions, and measurement results of Samples 8 to 12 in the experimental examples;

FIG. 28 is a diagram showing components, manufacturing conditions, and measurement results of Samples 13 to 17 in the experimental examples;

FIG. 29 is a diagram showing components, manufacturing conditions, and measurement results of Samples 18 to 22 in the experimental examples;

FIG. 30 is a diagram showing components, manufacturing conditions, and measurement results of Samples 23 to 28 in the experimental examples; and FIG. 31 is a diagram showing components, manufacturing conditions, and measurement results of Samples 29 to 34 in the experimental examples.

DETAILED DESCRIPTION

Figure 1:
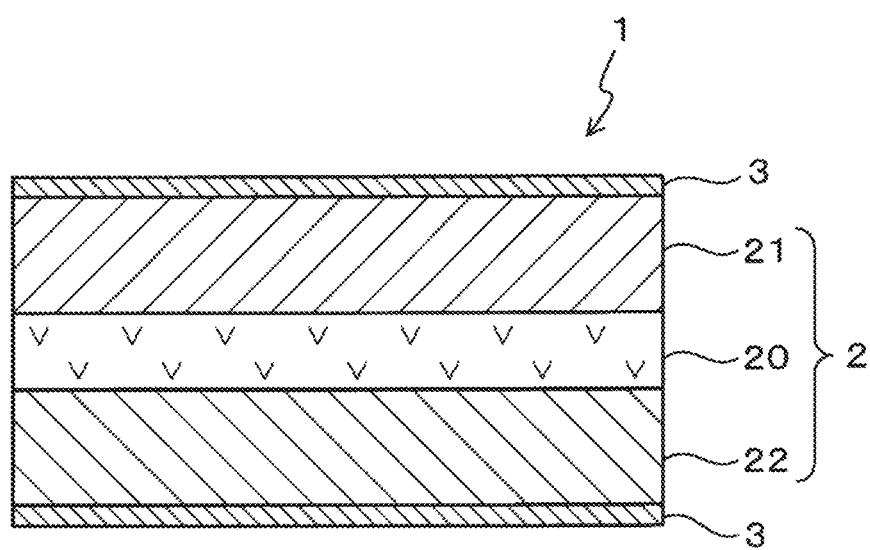
FIG. 1 is a cross-sectional view schematically showing an example of a positive electrode layer and an all-solid-state battery including the positive electrode layer according to a first embodiment.

Next, a relevant technology is described only for understanding the following embodiments. JP 2017-168396 A1 (hereinafter, referred to as Patent Literature 1) corresponding to US 2019/0084887 A1 and US 2020/0369574 A1 describes a solid electrolyte including an amorphous first electrolyte of a garnet type composed of lithium lanthanum zirconate doped with Ga, and an amorphous second electrolyte containing two kinds selected from Nb, Ta, and Sb, and Li. Patent Literature 1 describes that the solid electrolyte is used as a solid electrolyte layer of a lithium ion battery, that is, as a separator layer. Further, Patent Literature 1 describes that the solid electrolyte is obtained by performing the main firing at a temperature of 900° C. or higher and lower than 1000° C.

The technique of Patent Literature 1 is for improving an ionic conductivity of the solid electrolyte used as the separator layer by reducing a grain boundary resistance between the first electrolyte and the second electrolyte in the solid electrolyte. Therefore, the technique of Patent Literature 1 does not aim at increasing a capacity and an output of an all-solid-state battery by improving a positive electrode layer.

Further, the technique of Patent Literature 1 requires sintering in a temperature range of 900° C. or higher. However, when a garnet-type solid electrolyte is used for a positive electrode and is sintered in a temperature range of 900° C. or higher, a heterogeneous phase that does not contribute to a charge/discharge reaction is generated by the reaction with a positive electrode active material. Therefore, the capacity and the output of the all-solid-state battery decrease. Further, for example, a Bi-doped garnet-type solid electrolyte is decomposed by sintering in a temperature range of 900° C. or higher. Therefore, the output of the all-solid-state battery is reduced.

A positive electrode layer for an all-solid-state battery according to a first aspect of the present disclosure includes a first phase including a positive electrode active material containing Li, a second phase including a garnet-type solid electrolyte containing Li, Bi, M2, and O, and a third phase different from the first phase and the second phase. The third phase includes a Li—Bi-M2-O based compound containing Li, Bi, M2, and O. M2 is at least one element selected from the group consisting of Ca, Sr, Ba, Mg, Y, and Rb.

An all-solid-state battery (sometimes referred to as an all-solid-state lithium-ion secondary battery) that uses a solid electrolyte exhibiting lithium ion conductivity is charged or discharged by the exchange of lithium ions ($Li^+$) and electrons ($e^-$). In a positive electrode layer, this exchange is performed at an interface between a positive electrode active material and the solid electrolyte. Therefore, if the interface between the positive electrode active material and the solid electrolyte can be increased, the above-described exchange can be smoothly performed, which is advantageous for increasing the capacity and the output of the all-solid-state battery. On the contrary, if the interface between the positive electrode active material and the solid electrolyte is small, since the above exchange is performed only at the interface where the positive electrode active material and the solid electrolyte are in contact, and the positive electrode active material in a portion where the positive electrode active material and the solid electrolyte are not in contact with each other is not used, the all-solid-state battery has a low-capacity. Further, when the all-solid-state battery is charged and discharged at a certain current value, the current flows only at the interface where the positive electrode active material and the solid electrolyte are in contact with each other in the positive electrode layer. Therefore, if the portion where the positive electrode active material and the solid electrolyte are in contact with each other is small, the current density at the interface becomes large and the interface resistance becomes high, so that the all-solid-state battery has a low output. In order to increase the interface between the positive electrode active material and the solid electrolyte, it is effective to increase the density of the positive electrode layer.

In the positive electrode layer for the all-solid-state battery according to the first aspect, the Li—Bi-M2-O-based compound contained in the third phase different from the first phase and the second phase can be generated from a part of the solid electrolyte in the second phase at a low sintering temperature of less than 900° C. during manufacture of the positive electrode layer, and promotes the progress of sintering of the positive electrode layer. Therefore, in the positive electrode layer for the all-solid-state battery, the density is improved, and the interface between the positive electrode active material and the solid electrolyte, which is a portion where lithium ions and electrons are exchanged, increases. As a result, in the positive electrode layer for the all-solid-state battery, the amount of the positive electrode active material in contact with the interface between the positive electrode active material and the solid electrolyte increases, and the capacity is improved. Further, in the positive electrode layer for the all-solid-state battery, the current density at the interface between the positive electrode active material and the solid electrolyte is unlikely to increase, and the interface resistance can be lowered. Since the positive electrode layer for the all-solid-state battery includes the third phase containing the Li—Bi-M2-O-based compound in addition to the first phase including the positive electrode active material containing Li, the capacity and the output of the all-solid-state battery can be increased. Further, since the positive electrode layer for the all-solid-state battery contains the Li—Bi-M2-O-based compound capable of absorbing and releasing Li at around 3 V, it is advantageous for improving the charge/discharge capacity of the all-solid-state battery.

An all-solid-state battery according to a second aspect of the present disclosure includes the positive electrode layer according to the first aspect. Therefore, the all-solid-state battery of the second aspect can have a high capacity and a high output.

A manufacturing method of a positive electrode layer for an all-solid-state battery according to a third aspect of the present disclosure includes sintering a positive electrode layer forming material at a temperature less than 900° C., the positive electrode layer forming material including a positive electrode active material containing Li and a garnet-type solid electrolyte containing Li, Bi, M2, and O. Therefore, the manufacturing method according to the third aspect can preferably manufacture the positive electrode layer for the all-solid-state battery according to the first aspect.

Therefore, the above aspects of the present disclosure can provide an all-solid-state battery capable of increasing a capacity and an output, a positive electrode layer applied to the all-solid-state battery, and a manufacturing method of the positive electrode layer, by improving the positive electrode layer including a garnet-type solid electrolyte.

Hereinafter, a positive electrode layer for an all-solid-state battery, a manufacturing method of a positive electrode layer for an all-solid-state battery, and an all-solid-state battery according to multiple embodiments will be described in detail with reference to the drawings. The positive electrode layer for the all-solid-state battery, the manufacturing method of the positive electrode layer, and the all-solid-state battery according to the multiple embodiments are not limited by the following examples.

First Embodiment

A positive electrode layer for an all-solid-state battery and an all-solid-state battery according to a first embodiment will be described with reference to FIG. 1 to FIG. 3. As illustrated in FIG. 1, a positive electrode layer 21 for an all-solid-state battery of the present embodiment is applied to an all-solid-state battery 1 using, as an electrolyte, a solid-state electrolyte exhibiting lithium ion conductivity. The all-solid-state battery 1 of the present embodiment includes the positive electrode layer 21 of the present embodiment.

<All-Solid-State Battery>

The all-solid-state battery 1 includes a cell 2 and a current collecting layer 3. FIG. 1 illustrates the all-solid-state battery 1 in which the cells 2 is sandwiched between a pair of current collecting layers 3. Although not shown, the all-solid-state battery 1 may include multiple cells 2, and may have a laminated structure in which the multiple cells 2 are laminated via the current collecting layers 3, that is, the cells 2 and the current collecting layer 3 are alternately laminated. Specifically, the cell 2 includes a separator layer 20, a positive electrode layer 21 provided on a first surface of the separator layer 20, and a negative electrode layer 22 provided on a second surface of the separator layer 20 opposite from the first surface. The separator layer 20, the positive electrode layer 21, and the negative electrode layer 22 can be integrated by sintering. That is, both the positive electrode layer 21 and the negative electrode layer 22 can be bonded to the separator layer 20. The current collecting layer 3 can be integrated with the positive electrode layer 21 or the negative electrode layer 22 by sintering. That is, the current collecting layer 3 can be bonded to the positive electrode layer 21 or the negative electrode layer 22.

<Positive Layer>

Figure 2:
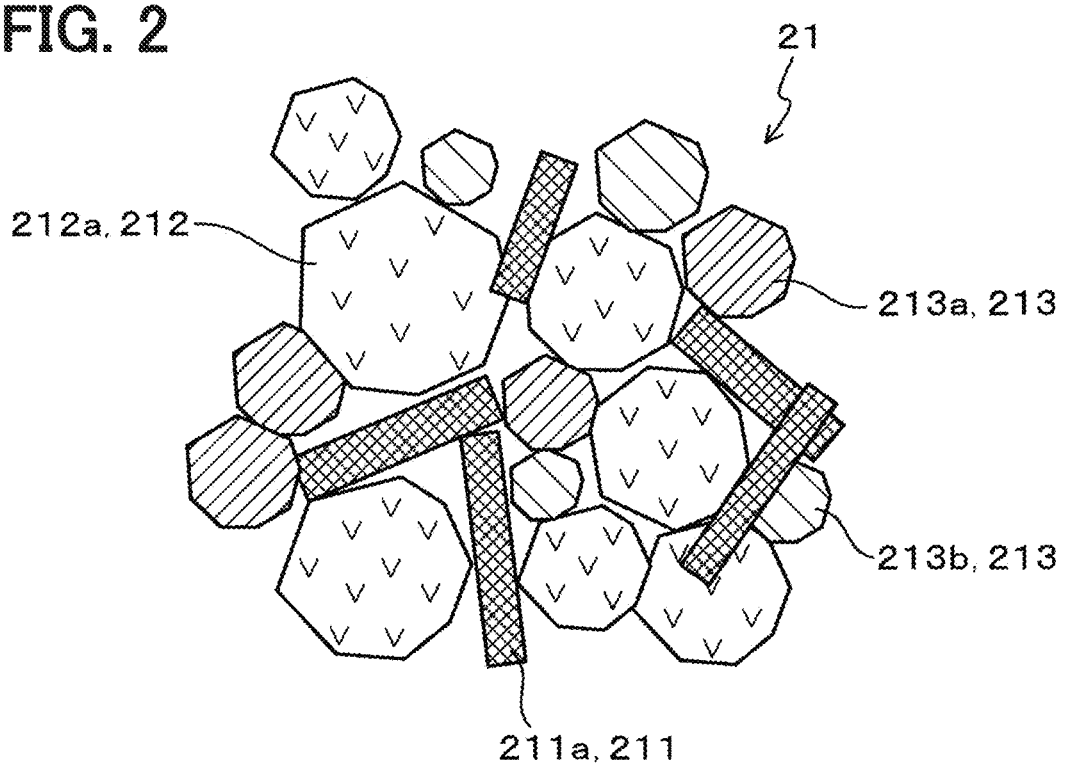
FIG. 2 is an explanatory diagram schematically showing a microstructure of the positive electrode layer for the all-solid-state battery according to the first embodiment.
Figure 3:
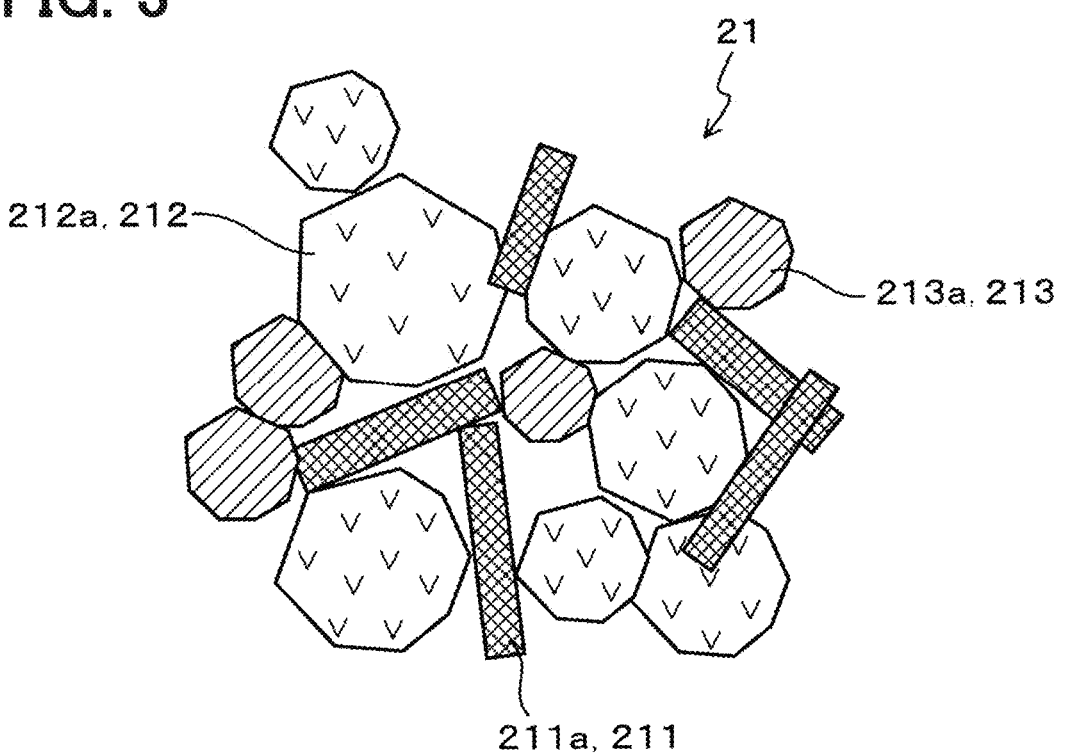
FIG. 3 is an explanatory diagram schematically showing a modified example of the microstructure of the positive electrode layer for the all-solid-state battery according to the first embodiment.

As illustrated in FIG. 2, the positive electrode layer 21 includes a first phase 211, a second phase 212, and a third phase 213.

The first phase 211 includes a positive electrode active material 211a containing Li (lithium). The positive electrode active material 211a is a substance capable of releasing lithium ions when the all-solid-state battery 1 is charged and taking in lithium ions when the all-solid-state battery 1 is discharged. Examples of the positive electrode active material 211a include composite oxides of Li and a transition metal including lithium cobalt oxide such as $LiCoO_2$, lithium nickel manganese cobalt oxide such as $LiNi_xMn_yCo_zO_2$ (x+y+z=1), and lithium manganate such as $LiMn_2O_4$, and lithium iron phosphate such as $LiFePO_4$. These materials can be used alone or in combination of two or more. It is preferable that the positive electrode active material 211a is a material that is difficult to form an impurity phase by reacting with a solid electrolyte 212a in the second phase described later when sintered at a sintering temperature of less than 900° C. This is because when an impurity phase is generated by the reaction with the solid electrolyte 212a, the conductivity of the positive electrode layer 21 decreases and the resistance of the positive electrode layer 21 increases. From this point of view, the positive electrode active material 211a may be composed of a composite oxide containing Li and Co such as lithium cobalt oxide and not containing Ni and Mn from the viewpoint that it is difficult to form an impurity phase at a sintering temperature of less than 900° C. However, the positive electrode active material 211a composed of a composite oxide containing Li, Ni, Mn, and Co, such as lithium nickel manganese cobalt oxide, is also useful for increasing the capacity and the output of the all-solid-state battery 1 since it is difficult to form an impurity phase by selecting a sintering temperature of 800° C. or lower.

The second phase 212 includes a garnet-type solid electrolyte 212a containing Li, Bi (bismuth), M2, and O (oxygen). Where, M2 is at least one element selected from the group consisting of Ca (calcium), Sr (strontium), Ba (barium), Mg (magnesium), Y (yttrium), and Rb (rubidium). That is, the solid electrolyte 212a of the second phase 212 has a garnet-type crystal structure and can be composed of a composite oxide containing Li, Bi, M2, and O.

The solid electrolyte 212a can contain at least one element selected from the group consisting of La (lanthanum), Zr (zirconium), M1 and M3 in addition to Li, Bi, M2, O. Specifically, the solid electrolyte 212a can contain, for example, Li, Bi, M2, O, and at least one element of La or Zr. Further, for example, the solid electrolyte 212a may further contain at least one element of M1 or M3 in addition to the above elements. Where, M1 is Al (aluminum) or Ga (gallium). M3 is at least one element selected from the group consisting of Ta (tantalum), Nb (niobium), Ge (germanium), Te (tellurium), Sc (scandium), Sb (antimony), and Hf (hafnium).

More specifically, examples of the solid electrolyte 212a can include lithium lanthanum zirconium-based composite oxides in which, in a basic composition of $Li_7La_3Zr_2O_{12}$ (sometimes referred to as LLZ), at least a part of La is replaced with M2 and a part of Zr is replaced with Bi, and further a part of Li is replaced with M1, and/or a part of Zr is replaced with M3.

More specifically, the solid electrolyte 212a can have a composition of $Li_{7-3x+\alpha y-z+\beta g}(M1)_x La_h(M2)_y Zr_{2-z-g}(Bi)_z (M3)_g O_{12\pm\delta}$, where M1 is Al or Ga as described above, M2 is at least one element selected from the group consisting of Ca, Sr, Ba, Mg, Y, and Rb as described above, and M3 is at least one element selected from the group consisting of Ta, Nb, Ge, Te, Sc, Sb, and Hf as described above. $\alpha$ satisfies $0 \leq \alpha \leq 2$ depending on the valence of M2. $\beta$ satisfies $-2 \leq \beta \leq 1$ depending on the valence of M3. x satisfies $0 \leq x \leq 0.4$. y satisfies $0 < y \leq 2.8$. z satisfies $0 < z \leq 2$. g satisfies $0 \leq g < 2$. h and y satisfy $3-y-0.2 < h \leq 3-y$. $\delta$ is an indefinite amount of oxygen. The oxygen moiety in the above composition may be any of "$O_{12}$", "$O_{12+\delta}$", and "$O_{12-\delta}$". When the solid electrolyte 212a has the above composition, the above-described effect can be ensured.

In the composition of the solid electrolyte 212a, M1 can be Ga. According to this configuration, the conductivity and the density of the positive electrode layer 21 can be easily increased as compared with the case where M1 is Al. Therefore, according to this configuration, it becomes easier to increase the capacity and the output of the all-solid-state battery 1 as compared with the case where M1 is Al.

In the composition of the solid electrolyte 212a, x can be more than 0, preferably 0.05 or more, more preferably 0.075 or more, still more preferably 0.1 or more, still more preferably 0.125 or more, and still more preferably 0.15 or more. In this case, the conductivity and the density of the positive electrode layer 21 can be easily increased, and the capacity and the output of the all-solid-state battery 1 can be easily increased as compared with the case where M1 is not doped (when x=0). In the composition of the solid electrolyte 212a, x is preferably 0.3 or less, more preferably 0.29 or less, and still more preferably 0.27 or less, from the viewpoint of improving the conductivity and the density of the positive electrode layer 21. In the composition of the solid electrolyte 212a, x is still more preferably 0.25 or less, still more preferably 0.24 or less, still more preferably 0.23 or less, still more preferably 0.22 or less, and still more preferably 0.21 or less. In this case, the conductivity and the density of the positive electrode layer 21 can be easily increased, and the capacity and the output of the all-solid-state battery 1 can be easily increased as compared with the case where M1 is not doped (when x=0).

In the composition of the solid electrolyte 212a, when M1 is Ga and x satisfies $0.05 \leq x \leq 0.25$, the conductivity and the density of the positive electrode layer 21 are further increased by the synergistic effect of both. This makes it easier to increase the capacity and the output of the all-solid-state battery 1.

In the composition of the solid electrolyte 212a, M2 is an element useful for improving the conductivity of the positive electrode layer 21 and improving the density of the positive electrode layer 21. Further, M2 is an element necessary for producing a Li—Bi-M2-O-based compound 213a and a Li-M2-B—O-based compound 213b in the third phase 213, which will be described later. M2 can preferably be Ca, Sr, Ba or the like. These elements can be used alone or in combination of two or more. When M2 is at least one element selected from the group consisting of Ca, Sr, and Ba, sintering can proceed at a lower temperature than when M2 is Mg, Y, Rb, or the like. Therefore, according to this configuration, it is possible to ensure high capacity and high output of the all-solid-state battery 1. Among the above M2 elements, Ca is particularly preferable. Mg, Y, and Rb are also useful since the conductivity and the density of the positive electrode layer 21 can be increased as compared with the case where M2 is not doped (when y=0), although not as high as Ca, Sr, and Ba, In the composition of the solid electrolyte 212a, y is preferably 0.01 or more, more preferably 0.02 or more, still more preferably 0.03 or more, still more preferably 0.04 or more, and still more preferably 0.05 or more. In this case, the conductivity and the density of the positive electrode layer 21 can be easily increased, and the capacity and the output of the all-solid-state battery 1 can be easily increased as compared with the case where M2 is not doped (when y=0). In the composition of the solid electrolyte 212a, y is preferably 2.5 or less, more preferably 2 or less, still more preferably 1.5 or less, and still more preferably 1 or less, from the viewpoint of improving the conductivity and the density of the positive electrode layer 21. In the composition of the solid electrolyte 212a, y can be more preferably 0.5 or less, still more preferably 0.45 or less, and still more preferably 0.4 or less. In this case, the conductivity and the density of the positive electrode layer 21 can be easily increased, and the capacity and the output of the all-solid-state battery 1 can be easily increased as compared with the case where M2 is not doped (when y=0).

In the composition of the solid electrolyte 212a, Bi is an element necessary for producing the Li—Bi-M2-O-based compound 213a in the third phase 213, which will be described later. In the composition of the solid electrolyte 212a, z can be preferably 0.51 or more, more preferably 0.52 or more, still more preferably 0.53 or more, and still more preferably 0.55 or more. In this case, the lattice constant can be expanded by inserting Bi having an ionic radius larger than an ionic radius of Zr, which has an advantage that the conductivity can be easily increased. In the composition of the solid electrolyte 212a, z is preferably less than 2, more preferably 1.8 or less, still more preferably 1.5 or less, still more preferably 1.2 or less, still more preferably 1.0 or less, still more preferably 0.95 or less, and still more preferably 0.9 or less.

Bi is an element that tends to be unstable with respect to Li metal. Therefore, it is probable that Patent Literature 1, which refers to a solid electrolyte applied to a separator layer instead of a positive electrode layer, does not take up the Bi-doped garnet-type solid electrolyte as an example. Further, Patent Literature 1 does not evaluate the charge/discharge characteristics because the invention disclosed in Patent Literature 1 relates to the solid electrolyte applied to the separator layer. Therefore, it can be said that Patent Literature 1 does not disclose or suggest any of the above-described effects of improving the capacity and the output of the all-solid-state battery 1.

In the composition of the solid electrolyte 212a, M3 is a Li carrier concentration adjusting element and can be added as needed. As M3, Hf, Sc, Ge and the like can be preferably used from the viewpoint of easily increasing the Li carrier concentration. These elements can be used alone or in combination of two or more. Among these elements, Sc is particularly preferable.

In the composition of the solid electrolyte 212a, g is preferably 0 from the viewpoint of not lowering the lattice constant and the sinterability. This is because the following reasons can be considered. From the viewpoint of the ionic radius, the lattice constant is lowered except for Sc. The detailed reason is not clear, but when Sc is added, which does not cause a decrease in the lattice constant, the sinterability decreases. When considering the binding force between Sc—O and Zr—O, the binding force of Sc—O is weaker. It is considered that this is because the binding force of Zr—O is higher than that in the case of not doping, and the atomic diffusion does not occur at the time of sintering. When 0<g, g can be preferably 0.01 or more, more preferably 0.02 or more, and still more preferably 0.05 or more. In this case, there are advantages such as being able to increase the Li carrier concentration reduced by Bi-doping. In the composition of the solid electrolyte 212a, g can be preferably 0.15 or less, more preferably 0.14 or less, and still more preferably 0.1 or less. In this case, there is an advantage that the Li carrier concentration can be adjusted while avoiding a decrease in resistance due to impurity generation due to excessive M3 doping.

In the composition of the solid electrolyte 212a, h indicating the amount of La satisfies 3−y−0.2<h≤3−y. h preferably satisfies 3−y−0.2<h<3−y. This reason will be described. In the composition of the solid electrolyte 212a, when the amount of La is in a stoichiometric composition in which the charge is balanced, that is, when h=3−y, an impurity phase of $La_2O_3$ is formed in the positive electrode layer 21 and the conductivity is lowered. It is presumed that this is because La, which has the heaviest element weight among the constituent elements and has slow diffusion, tends to remain unreacted with other constituent elements. Therefore, h preferably satisfies h<3−y. That is, it is preferable that the amount of La is smaller than that in the case where the amount of La is in the stoichiometric composition. In this case, the impurity phase of $La_2O_3$ is less likely to form in the positive electrode layer 21, and it becomes easy to improve the conductivity of the positive electrode layer 21. Further, compared with a case where h≤3−y−0.2 (the amount of La is smaller than that in the stoichiometric composition by 0.2 or more), and a case where h=3−y (the amount of La is in the stoichiometric composition), the conductivity of the positive electrode layer 21 tends to be lower. Therefore, h preferably satisfies 3−y−0.2<h<3−y. h is more preferably 3−y−0.18≤h<3−y, still more preferably 3−y−0.18<h<3−y, still more preferably 3−y−0.17≤h<3−y, still more preferably 3−y−0.17<h<3−y, still more preferably 3−y−0.16≤h<3−y, still more preferably, 3−y−0.16<h<3−y, still more preferably 3−y−0.15≤h<3−y, still more preferably 3−y−0.15<h<3−Y, still more preferably 3−y−0.14≤h<3−y, still more preferably 3−y−0.14<h<3−y, still more preferably 3−y−0.13≤h<3−y, still more preferably 3−y−0.13<h<3−y, still more preferably 3−y−0.12≤h<3−y, still more preferably 3−y−0.12<h<3−y, still more preferably 3−y−0.11≤h<3−y, still more preferably 3−y−0.11<h<3−y, still more preferably 3−y−0.10≤h<3−y, and still more preferably 3−y−0.10<h<3−y. According to this configuration, the decrease in conductivity due to the excessive reduction of La is suppressed, and the conductivity of the positive electrode layer 21 can be easily improved.

In the composition of the solid electrolyte 212a, α satisfies 0≤α≤2 depending on the valence of M2. Specifically, when M2 is an element having a valence of 2+ such as Ca, Sr, Ba, and Mg, α is 1. Further, when M2 is an element having a valence of 1+ such as Rb, α is 2. Further, when M2 has a valence of 3+ like Y, α is 0. That is, assuming that the valence of M2 is a, the value of α=La valence (that is, 3)−a is taken. This is because La has a valence of 3+ in the lithium lanthanum zirconium-based composite oxide, so when an element having a different valence is selected as M2, $Li^+$ is increased or decreased for charge compensation.

In the composition of the solid electrolyte 212a, β satisfies −2≤β≤1 depending on the valence of M3. Specifically, when M3 is an element having a valence of 6+ such as Te, β is −2. Further, when M3 is an element having a valence of 5+ such as Ta, Nb, and Sb, β is −1. Further, when M3 has a valence of 4+ such as Ge and Hf, β is 0. Further, when M3 has a valence of 3+ such as Sc, β is 1. That is, assuming that the valence of M3 is b, the value of β=Zr valence (that is, 4)−b is taken. This is because Zr has a valence of 4+ in the lithium lanthanum zirconium-based composite oxide, so when an element with a different valence is selected as M3, $Li^+$ is increased or decreased for charge compensation.

In the composition of the solid electrolyte 212a, 7−3x+αy−z+βg indicating the amount of Li preferably satisfies 6.2<7−3x+αy−z+βg<6.7. That is, the value can be selected from each of the above-described ranges of x, α, y, z, β, and g so that 7−3x+αy−z+βg is larger than 6.2 and smaller than 6.7. The reason for this is as follows. The expression of lithium ion conductivity by lithium ions in the lithium lanthanum zirconium-based composite oxide is due to the mechanism of hopping and conducting pores. In order to improve the lithium ion conductivity, it is necessary to improve the lithium carrier concentration and the pore concentration, but these are contradictory. However, when 6.2<7−3x+αy−z+βg<6.7 is satisfied, the balance between the lithium carrier concentration and the pore concentration can be maintained in a good range, and the conductivity of the solid electrolyte 212a can be improved and that is advantageous in reducing the resistance of the positive electrode layer 21.

The composition of the solid electrolyte 212a described above is a theoretical composition, but in particular, Li is an element that volatilizes at a high temperature during the production of the positive electrode layer 21 and causes a composition deviation. Therefore, in the composition of the solid electrolyte 212a, the amount of Li determined by 7−3x+αy−z+βg can include a range of 0.85 to 1.1 times the value calculated by 7−3x+αy−z+βg.

The third phase 213 is a phase different from the first phase 211 and the second phase 212. The third phase 213 includes the Li—Bi-M2-O-based compound 213a containing Li, Bi, M2, and O. That is, the Li—Bi-M2-O-based compound 213a is different from the positive electrode active material 211a of the first phase 211 and the solid electrolyte 212a of the second phase 212. The Li—Bi-M2-O-based compound 213a may be crystalline or amorphous.

The compounds constituting the Li—Bi-M2-O-based compound 213a can further contain M1 in addition to Li, Bi, M2, and O. This M1 is Al or Ga, and is preferably Ga from the viewpoints of improving the density of the positive electrode layer 21, increasing the capacity of the all-solid-state battery 1, increasing the output, and the like. The M1 element that can be contained in the Li—Bi-M2-O-based compound 213a may be derived from the solid electrolyte 212a of the second phase 212, or may be derived from a sintering aid and the like different from the solid electrolyte 212a of the second phase 212. That is, even when the solid electrolyte 212a of the second phase 212 does not contain M1, the Li—Bi-M2-O-based compound 213a can contain M1.

If the third phase 213 contains at least the Li—Bi-M2-O-based compound 213a, the third phase 213 may contain one or more other components different from the Li—Bi-M2-O-based compound, the positive electrode active material 211a of the first phase 211, and the solid electrolyte 212a of the second phase 212. For example, the third phase 213 can contain the Li-M2-B—O-based compound 213b that contains a compound containing Li, M, B, and O in addition to the Li—Bi-M2-O-based compound 213a. According to this configuration, compared with a case where the third phase 213 includes only the Li—Bi-M2-O-based compound 213a and does not include the Li-M2-B—O-based compound 213b, as illustrated in FIG. 3, the sintering of the positive electrode layer 21 can proceed at a lower temperature. Therefore, according to this configuration, the density and the conductivity of the positive electrode layer 21 can be further improved and there is an advantageous for increasing the capacity and output of the solid-state battery 1 as compared with the case where the third phase 213 includes only the Li—Bi-M2-O-based compound 213a.

The element B contained in the Li-M2-B—O-based compound 213b can be a component derived from a sintering aid and the like different from the positive electrode active material 211a of the first phase 211 and the solid electrolyte 212a of the second phase 212. That is, even when the positive electrode active material 211a of the first phase 211 and the solid electrolyte 212a of the second phase 212 do not contain B, the Li-M2-B—O-based compound 213b can be produced.

The compounds constituting the Li-M2-B—O-based compound 213b can further contain M1 in addition to Li, M2, B, and O. This M1 is Al or Ga, and is preferably Ga from the viewpoints of improving the density of the positive electrode layer 21, increasing the capacity of the all-solid-state battery 1, increasing the output, and the like. The M1 element that can be contained in the Li-M2-B—O-based compound 213b may be derived from the solid electrolyte 212a of the second phase 212, or may be derived from a component such as a sintering aid different from the solid electrolyte 212a of the second phase 212. That is, even when the solid electrolyte 212a of the second phase 212 does not contain M1, the Li-M2-B—O-based compound 213b can contain M1.

Other examples that can be contained in the third phase 213 include a sintering aid, La, Zr, and the like. These may be contained alone or in combination of two or more. Examples of the sintering aid include lithium boron-containing oxides such as $Li_3BO_3$ and $Li_{2+x}B_xC_{1-x}O_3$ (0<x<1) (hereinafter, may be abbreviated as LBCO), lithium phosphorus-containing oxides such as $Li_3PO_4$, and the like, lithium silicon-containing oxides such as $Li_4SiO_4$ and $Li_2SiO_3$, $Ga_2O_3$, $Al_2O_3$ and the like. These may be contained alone or in combination of two or more.

In the positive electrode layer 21, efficiently transporting lithium ions ($Li^+$) and electrons ($e^-$) exchanged at the interface between the positive electrode active material of the first phase 211 and the solid electrolyte of the second phase 212 to the negative electrode layer 22 contributes to high capacity and high output of the all-solid-state battery 1. If the transport of lithium ions and electrons in the positive electrode layer 21 is not successful, the resistance will increase accordingly, an extra overvoltage will occur, and the capacity and the output will be low. In order to improve the transport of lithium ions, it is preferable to improve the lithium ion conductivity of the solid electrolyte of the second phase 212 in the positive electrode layer 21. On the other hand, regarding the transport of electrons, since the solid electrolyte is an insulator and cannot transport electrons, the positive electrode active material 211a of the first phase 211 is responsible. Generally, electron conduction is faster than ionic conduction, so it is unlikely to be a problem. However, when electron conduction is rate-determining, for example, a surface of the positive electrode active material 211a of the first phase 211 in the positive electrode layer 21 can be coated with an electron conductive component. Further, for example, a conductive assistant such as acetylene black can be added into the positive electrode layer 21.

In the positive electrode layer 21, the positive electrode active material 211a of the first phase 211 and the solid electrolyte 212a of the second phase 212 can be made into particles, for example. The third phase 213 does not have to be in the form of particles, and may be in the form of particles. In the positive electrode layer 21 shown in FIGS. 2 and 3, multiple particulate positive electrode active materials 211a included in the first phase 211 are three-dimensionally connected to form an electron conduction path. The particulate solid electrolyte 212a included in the second phase 212 is filled in gaps around the multiple particulate positive electrode active materials 211a in a row to form a lithium ion conduction path. The exchange of lithium ions and electrons is carried out through the interface between the positive electrode active material 211a and the solid electrolyte 212a.

In the positive electrode layer 21, the volume ratio of the first phase 211 to the second phase 212 can be, for example, in the range of 30:70 to 70:30.

In the positive electrode layer 21, the area ratio (%) of the third phase 213 to the entire cross section of the positive electrode layer 21 can be smaller than the area ratio (%) of the first phase 211 to the entire cross section of the positive electrode layer 21, and the area ratio (%) of the second phase 212 to the entire cross section of the positive electrode layer 21. According to this configuration, the density of the positive electrode layer 21 can be improved while minimizing the proportion of the third phase 213 whose electric capacity is lower than that of the positive electrode active material 211a and whose electric resistance is larger than that of the solid electrolyte 212a. Further, the area ratio (%) of the first phase 211 to the entire cross section of the positive electrode layer 21 may be larger than the area ratio (%) of the second phase 212 to the entire cross section of the positive electrode layer 21. According to this configuration, the electric capacity of the positive electrode layer 21 can be increased, and there is an advantage that the all-solid-state battery 1 with a high capacity can be easily obtained.

The relative density of the positive electrode layer 21 is preferably more than 75%, more preferably 76% or more, still more preferably 77% or more, still more preferably 78% or more, still more preferably 79% or more, and still more preferably 80% or more from the viewpoint of increasing the capacity and the output of the all-solid-state battery 1.

The first phase 211, the second phase 212, and the third phase 213 in the positive electrode layer 21 can be specified by analyzing the cross section of the positive electrode layer 21 with a scanning electron microscope (SEM), an energy dispersive X-ray (EDX) analysis, and a time-of-flight secondary ion mass spectrometry (TOF), and the like. Details will be described in experimental examples.

<Separator Layer, Negative Electrode Layer, Current Collecting Layer>

The separator layer 20 includes a solid electrolyte (not shown) exhibiting lithium ion conductivity. Specifically, the separator layer 20 can be densely formed from multiple particulate solid electrolytes. The negative electrode layer 22 includes a negative electrode active material (not shown) containing Li. Specifically, the negative electrode layer 22 can include a negative electrode active material containing Li and a solid electrolyte (not shown) exhibiting lithium ion conductivity. More specifically, the negative electrode layer 22 can be formed into a porous shape from particulate negative electrode active materials and multiple particulate solid electrolytes.

Specifically, the solid electrolyte used for the separator layer 20 and the negative electrode layer 22 can be composed of a solid electrolyte having a garnet-type crystal structure exhibiting lithium ion conductivity. More specifically, examples of the solid electrolyte used for the separator layer 20 and the negative electrode layer 22 include, for example, the above-described solid electrolyte used for the positive electrode layer 21, and $Li_7La_3Zr_2O_{12}$ (LLZ) and $Li_7La_3Zr_2O_{12}$ a part of which is substituted with at least one element selected from the group consisting of Sr, Ca, Nb, Al, Ta, Ge, and Sb (for example, a part of La of $Li_7La_3Zr_2O_{12}$ is substituted with an element such as Sr, Ca, and the like, and/or a part of Zr is substituted with an element such as Nb, Ta, and the like). The solid electrolytes used in the positive electrode layer 21, the separator layer 20, and the negative electrode layer 22 may be of the same type (same) or different.

Examples of the negative electrode active material used in the negative electrode layer 22 include a lithium metal, a lithium alloy, and a lithium compound such as a lithium-containing composite oxide. As the negative electrode active material, a lithium metal can be preferably used from the viewpoint of increasing the potential difference.

Examples of the material contained in the current collecting layer 3 include nickel, stainless steel, carbon, conductive glass, gold, lithium metal, and a mixture of these materials and insulating glass. The current collecting layer 3 on the positive electrode layer 21 and the current collecting layer 3 on the negative electrode layer 22 may be formed of the same material or may be formed of different materials.

Second Embodiment

A manufacturing method of a positive electrode layer for an all-solid-state battery according to a second embodiment will be described. In the second embodiment, the contents described in the first embodiment can be referred to as necessary.

The manufacturing method according to the present embodiment (hereinafter, simply referred to as the present manufacturing method) is a method of manufacturing the positive electrode layer for the all-solid-state battery according to the first embodiment. The present manufacturing method will be explained in detail below.

The present manufacturing method includes sintering a positive electrode layer forming material including a positive electrode active material containing Li and a solid electrolyte containing Li, Bi, M2, and O at a sintering temperature of less than 900° C. The sintering temperature means the maximum temperature of sintering in a main firing.

When the sintering temperature is 900° C. or higher, the reaction between the solid electrolyte and the positive electrode active material produces a heterogeneous phase that does not contribute to the charge/discharge reaction, which reduces the capacity and the output of the all-solid-state battery. Further, the Bi-doped solid electrolyte is decomposed at a sintering temperature of 900° C. or higher, which reduces the output of the all-solid-state battery. It is presumed that this is because Li and Bi tend to volatilize at a sintering temperature of 900° C. or higher, or a Li—Bi-M2-O-based compound is excessively generated from the solid electrolyte, and the crystal structure of the solid electrolyte collapses. Therefore, in the present manufacturing method, the sintering temperature of the positive electrode layer forming material, which is a non-sintered material for forming the positive electrode layer, is set to less than 900° C. The sintering temperature can be preferably 890° C. or lower, more preferably 870° C. or lower, still more preferably 860° C. or lower, and still more preferably 850° C. or lower. From the viewpoint of accelerating sintering, the sintering temperature can be preferably 640° C. or higher, more preferably 690° C. or higher, still more preferably 720° C. or higher, and still more preferably 730° C. or higher.

When a positive electrode active material composed of a composite oxide containing Li, Ni, Mn, and Co is selected as the positive electrode active material, it is preferable to select a sintering temperature of 800° C. or lower from the viewpoint of suppressing the formation of an impurity phase, and the like.

The sintering time can be, for example, 12 hours or more and 24 hours or less. Further, the sintering atmosphere can be, for example, an oxidizing atmosphere such as in air atmosphere. Sintering in a reducing atmosphere is not preferable because Bi is reduced.

Specifically, as the solid electrolyte used for the positive electrode layer forming material, the solid electrolyte described above in the first embodiment can be used. The solid electrolyte used for the positive electrode layer forming material can be synthesized, for example, as follows. Li source, M1 source, La source, M2 source, Zr source, Bi source, and M3 source, which are starting materials of the solid electrolyte, are weighed so as to have a predetermined molar ratio. The first embodiment can be referred to for the molar ratio, and the case where the molar ratio is 0 is also included. Each starting material can be prepared in the form of oxides, hydroxides, coal oxides, or the like when synthesizing by solid phase reaction, and in the form of nitrates or the like when synthesizing by wet synthesis. Next, the starting materials and an organic solvent such as ethanol are pulverized and mixed using a planetary ball mill containing zirconia balls or the like. Next, the obtained mixed powder is dried, sieved to be separated from zirconia balls, placed in an alumina crucible or the like, and sintered at 800° C. to 900° C. in an air atmosphere. As a result, a powdery solid electrolyte containing Li, M1, La, M2, Zr, Bi, M3, and O can be obtained in a predetermined molar ratio.

When the solid electrolyte used for the positive electrode layer forming material is a garnet-type solid electrolyte that does not contain M1 among the above-described garnet-type solid electrolytes in the first embodiment, the M1 element can be added in the form of oxide of the M1 element in the positive electrode layer forming material separately from the solid electrolyte. Specifically, the positive electrode layer forming material can further contain an oxide containing M1 in addition to the positive electrode active material and the solid electrolyte. According to this configuration, during sintering, M1 is doped into the solid electrolyte from the oxide to promote sintering, and a dense positive electrode layer can be formed at a lower temperature. That is, the oxide containing M1 can function as a sintering aid.

More specifically, the positive electrode layer forming material may contain one or more oxides containing Al or Ga. Examples of the oxide containing Al include $Al_2O_3$ and the like. Examples of the oxide containing Ga include $Ga_2O_3$ and the like. According to the above configuration, during sintering, Al or Ga is doped into the solid electrolyte from each oxide to promote sintering, and a dense positive electrode layer can be formed at a lower temperature. That is, both the oxide containing Al and the oxide containing Ga can function as a sintering aid.

For example, a case where the positive electrode layer forming material contains $Ga_2O_3$ will be used as an example, and the above will be described in more detail. In this case, at the time of sintering, exchange occurs between $Li^+$ contained in a solid electrolyte such as LLZ system without Ga and $Ga^{3+}$ contained in $Ga_2O_3$. Since the essence of sintering can be regarded as the diffusion phenomenon of elements, the occurrence of the above exchange is synonymous with the occurrence of element diffusion and can be regarded as the improvement of sinterability. When $Ga^{3+}$ diffuses into the solid electrolyte, $Li^+$ is released out of the solid electrolyte. However, when there are sintering aids such as $Li_3BO_3$ and LCBO, $Li^+$ is incorporated into these amorphous sintering aids. In the present manufacturing method, even if all Ga in $Ga_2O_3$ does not diffuse into the solid electrolyte, this does not become a resistance component. The excess Ga is doped with Li sites in the sintering aid, which can improve the conductivity of the sintering aid and contribute to increasing the output of the all-solid-state battery. Further, the melting point of $Li_3BO_3$, LCBO, and the like doped with Ga is lower than that of $Li_3BO_3$ alone, LCBO alone, and the like which are not doped with Ga, which can contribute to the improvement of the sinterability of the positive electrode layer. The same applies to the case where the positive electrode layer forming material contains $Al_2O_3$.

The positive electrode layer forming material may also contain one or more kinds of sintering aids, conductive assistants, binders, plasticizers and the like, if necessary. Examples of the sintering aid include lithium boron-containing oxides such as $Li_3BO_3$ and $Li_{2+x}B_xC_{1-x}O_3$ ($0<x<1$) (LBCO), $Ga_2O_3$ and $Al_2O_3$. These can be used alone or in combination of two or more. Examples of the conductive assistant include carbon such as acetylene black. As the binder, for example, polyvinyl butyral or the like can be used. As the plasticizer, for example, bis (2-ethylhexyl) adipate (DOA) or the like can be used.

Specifically, the sintering of the positive electrode layer forming material can be carried out, for example, by simultaneously sintering a positive electrode layer forming material, a non-sintered separator layer forming material for forming a separator layer, and a non-sintered negative electrode layer forming material for forming a negative electrode layer, and if necessary, a non-sintered current collecting layer forming material for forming a current collecting layer. In this case, the sintering of the positive electrode layer forming material may be carried out by sintering a laminated body in which the positive electrode layer forming material, the separator layer forming material, and the negative electrode layer forming material are laminated in this order, or may be carried out by sintering a laminated body in which the positive electrode layer forming material, the separator layer forming material, the negative electrode layer forming material, and the current collecting layer forming material are laminated in this order. Each layer can be a sheet molded product. When the current collecting layer is not ceramic, the current collecting layer can be formed after the above sintering. According to these methods, the positive electrode layer contained in the all-solid-state battery can be produced. Further, the sintering of the positive electrode layer forming material can also be carried out by sintering only the positive electrode layer forming material. According to this method, a single positive electrode layer can be produced.

The laminated body can be pressure-bonded after the materials for forming each layer are laminated and before sintering. Further, it is possible to perform degreasing firing for burning off organic components, for example, in an oxidizing atmosphere, at a firing temperature of 250° C. to 550° C., and for a firing time of 3 hours to 20 hours before sintering the positive electrode layer forming material (before sintering the above-mentioned laminated body).

Experimental Examples

<Preparation of Solid Electrolyte Powder>

As starting materials for solid electrolyte powder, Li source: $LiOH/H_2O$, La source: $La(OH)_3$, Zr source: $ZrO_2$, M1 source: $Al_2O_3$, $Ga_2O_3$, M2 source: $Ca(OH)_2$, $SrCO_3$, $BaCO_3$, $MgCO_3$, $Y_2(CO_3)_3$, $Rb_2CO_3$, Bi source: $Bi_2O_3$ were prepared. The powders of these starting materials were weighed so as to have a composition of each solid electrolyte shown in FIGS. 25 to 31. Then, each of the weighed starting materials and ethanol were pulverized and mixed using a planetary ball mill containing zirconia balls. Next, the obtained mixed powder was dried, sieved to be separated from zirconia balls, placed in an alumina crucible, and fired at 800° C. in an air atmosphere. Accordingly, each solid electrolyte powder having the composition shown in FIGS. 25 to 31 was synthesized. In FIGS. 25 to 31, "SIN AID" means a sintering aid, "TEMP" means a sintering temperature, "CONDUCTIVITY" means a conductivity of a positive electrode layer, and "RELATIVE DENSITY" means a relative density of the positive electrode layer, "W/" means present, "W/O" means absent, and "N/A" means not available.

<Manufacturing of Positive Electrode Layer and all-Solid-State Battery>

$LiCoO_2$ and $LiNi_{0.6}Mn_{0.2}Co_{0.2}O_2$ were prepared as the positive electrode active material powder. $Li_3BO_3$ was prepared as a sintering aid. The positive electrode active material powder, the solid electrolyte powder synthesized above, and the sintering aid were blended in a combination shown in FIGS. 25 to 31. When the sintering aid was absent, the compounding ratio was the positive electrode active material powder:the solid electrolyte powder=60% by volume:40% by volume. When the sintering aid was present, the compounding ratio was the positive electrode active material powder:the solid electrolyte powder:the sintering aid=60% by volume:30% by volume:10% by volume. Next, a BM-SZ solution (manufactured by Sekisui Chemical Co., Ltd.) as butyral resin-based binder and DOA as a plasticizing agent were added to a mixed powder obtained by mixing the positive electrode active material powder, the solid electrolyte powder, the sintering aid added as needed, and isoamyl acetate as an organic solvent to prepare each positive electrode layer forming slurry.

Next, each positive electrode layer forming slurry was formed into a sheet using a known applicator, and was pressed under the conditions of 85° C., 50 kPa, and 10 minutes to obtain each positive electrode layer forming sheet. Next, each of the obtained positive electrode layer forming sheets was sintered in an air atmosphere at a predetermined sintering temperature shown in FIGS. 25 to 31. As a result, the positive electrode layers of Samples 1 to 34, Sample 1C, and Sample 2C were prepared. The thickness of each positive electrode layer was 30 μm.

Next, using the same process as each solid electrolyte powder synthesized as described above, a solid electrolyte powder in which La sites are doped with Ca and Zr sites are doped with Ta, more specifically, $Li_{6.75}La_{2.95}Ca_{0.05}Zr_{1.7}Ta_{0.3}O_{12}$ was prepared. Further, a BM-SZ solution as a binder and DOA as a plasticizing agent are mixed with a mixed powder obtained by mixing this solid electrolyte powder, $Li_3BO_3$ and $Ga_2O_3$ as sintering aids, and isoamyl acetate as an organic solvent to prepare each separator layer forming slurry used for producing an all-solid-state battery of Samples 1 to 34, Sample 1C, or Sample 2C. The compounding ratio of the solid electrolyte powder and the sintering aid in the separator layer forming slurry was set to the solid electrolyte powder:$Li_3BO_3$:$Ga_2O_3$=88.6% by volume:10% by volume:1.4% by volume.

Next, each separator layer forming slurry was formed into a sheet using a known applicator to obtain each separator layer forming sheet. Each separator layer forming sheet and each positive electrode layer forming sheet were laminated and pressed under the conditions of 85° C., 50 kPa, and 10 minutes to obtain each laminated body. Next, each of the obtained laminated bodies was sintered in an air atmosphere at a predetermined sintering temperature shown in FIGS. 25 to 31. As a result, a separator layer/positive electrode layer bonded body in which the positive electrode layer was bonded to one surface of the separator layer was obtained. The thickness of the separator layer was set to 300 µm. The thickness of the positive electrode layer was 30 µm. Next, Au was sputtered on the surface of the positive electrode layer in the separator layer/positive electrode layer bonded body to form a positive electrode side current collecting layer. Next, Li metal was attached to the surface of the separator layer in the separator layer/positive electrode layer bonded body to form a negative electrode layer. Accordingly, the all-solid-state batteries of Samples 1 to 34, Sample 1C, and Sample 2C were produced.

<Measurement of Conductivity and Relative Density of Positive Electrode Layer>

For each positive electrode layer, a lithium ion conductivity (S/cm) at 60° C. and the relative density (%) were measured. The conductivity of the positive electrode layer was measured by attaching polyethylene oxide (PEO) as electrodes on both sides of the positive electrode layer, peeling off the PEO, measuring the conductivity of the PEO alone, and subtracting the PEO resistance. The relative density was calculated using the volume and weight of each sample, the specific gravity of the material, and the mixing ratio of the material. The specific gravity of the material was measured using "Accupic 1340-1CC" manufactured by Shimadzu Corporation.

<Evaluation of Charge/Discharge of all-Solid-State Battery>

The charge/discharge evaluation was measured for each of the produced all-solid-state batteries. Specifically, an all-solid-state battery produced in a glove box in which atmosphere is replaced by Ar was placed in a sealed cell made of SUS (manufactured by Hosen Co., Ltd.) to form a closed two-pole cell. At this time, the electrode retainer was used with a spring load of 1 kgf. This cell was placed in a constant temperature bath set at 25° C., connected to the 580 Battery Test System (manufactured by Scribner Associates), and the charge capacity of the all-solid-state battery was measured at 20 µA with a cutoff voltage of 4 V. Further, the discharge capacity of the all-solid-state battery was measured with the cutoff voltage set to 2V.

<Observation of Microstructure of Positive Electrode Layer>

Each resin-embedded positive electrode layer is CP (cross-section polisher) processed, and the cross section along the thickness direction was observed with a field emission scanning electron microscope (FE-SEM) ("S-4800" manufactured by Hitachi High-Tech, Ltd.). In addition, EDX analysis (energy dispersive X-ray analysis, using "QUANTAX Flat QUAD System Xflash5060FQ" manufactured by Bruker AXS) was performed on the SEM observation portion, and element mapping was obtained. In addition, the presence of Li was confirmed in the SEM observation portion by TOF-SIMS (time-of-flight secondary ion mass spectrometry, using "TOF. SIMS 5" manufactured by ION-TOF), if necessary. From the above, the first phase, the second phase, and the third phase different from the first phase and the second phase in the positive electrode layer have been identified. Further, if necessary, the impurity phase in the positive electrode layer was confirmed by performing an analysis by an X-ray diffraction method (XRD).

The composition, production conditions, measurement results, etc. of each sample are summarized in FIGS. 25 to 31. In addition, FIGS. 3 to 24 show graphs, SEM photographs, element mappings, XRD patterns, and the like obtained by the present experimental examples. Hereinafter, these will be used for discussion.

<Discussion 1>

According to FIGS. 4, 5, 6, and 25, the following can be seen. Each of Sample 1C and Sample 2C used a solid electrolyte containing Bi but not Ca, which is one of the M2 elements. Therefore, in each of Sample 1C and Sample 2C, a Li—Bi-M2-0 based compound could not be produced by sintering at a low sintering temperature of less than 900° C., and the sinterability of the positive electrode layer was poor. Therefore, in each of Sample 1C and Sample 2C, the relative density of the positive electrode layer was not improved, the interface between the positive electrode active material and the solid electrolyte was insufficiently increased, and the conductivity of the positive electrode layer was also lowered. Therefore, it can be said that each of Sample 1C and Sample 2C cannot increase the capacity and output of the all-solid-state battery.

On the other hand, each of Sample 1 and Sample 2 used a solid electrolyte containing Bi and Ca, which is one of the M2 elements. Therefore, in each of Sample 1 and Sample 2, a Li—Bi-M2-O-based compound (a Li—Bi—Ca—O-based compound in these examples) can be produced by sintering at a low sintering temperature of less than 900° C., and the progress of sintering of the positive electrode layer was promoted. Therefore, in each of Sample 1 and Sample 2, the relative density of the positive electrode layer was improved, the interface between the positive electrode active material and the solid electrolyte was sufficiently increased, and the conductivity of the positive electrode layer was also improved. Therefore, it can be said that each of Sample 1 and Sample 2 can increase the capacity and output of the all-solid-state battery.

Figure 4:
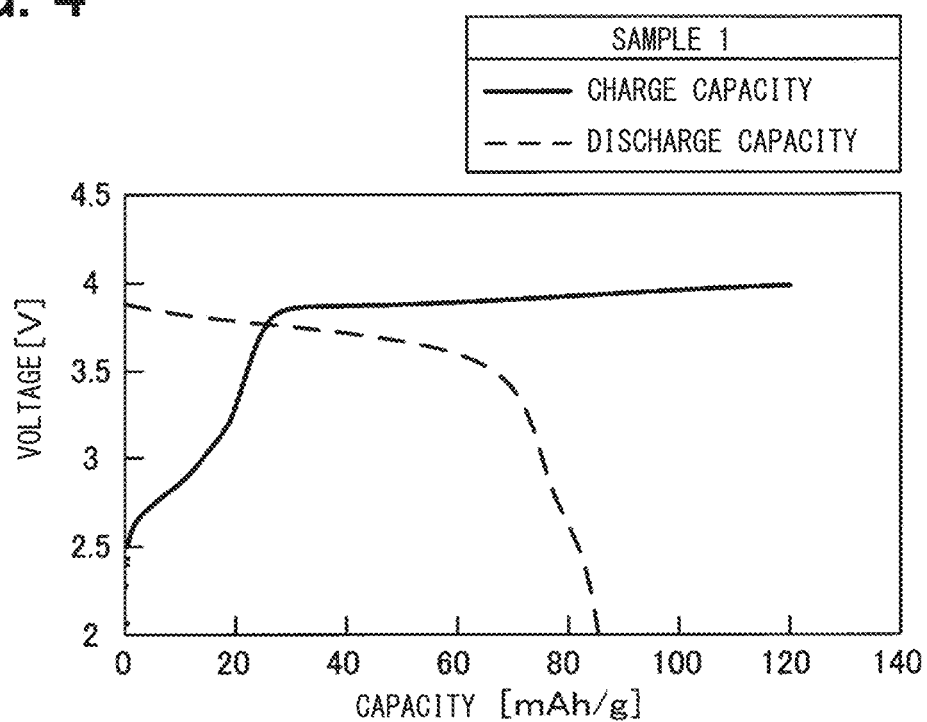
FIG. 4 is a diagram showing a charge/discharge curve of Sample 1 in experimental examples.
Figure 5:
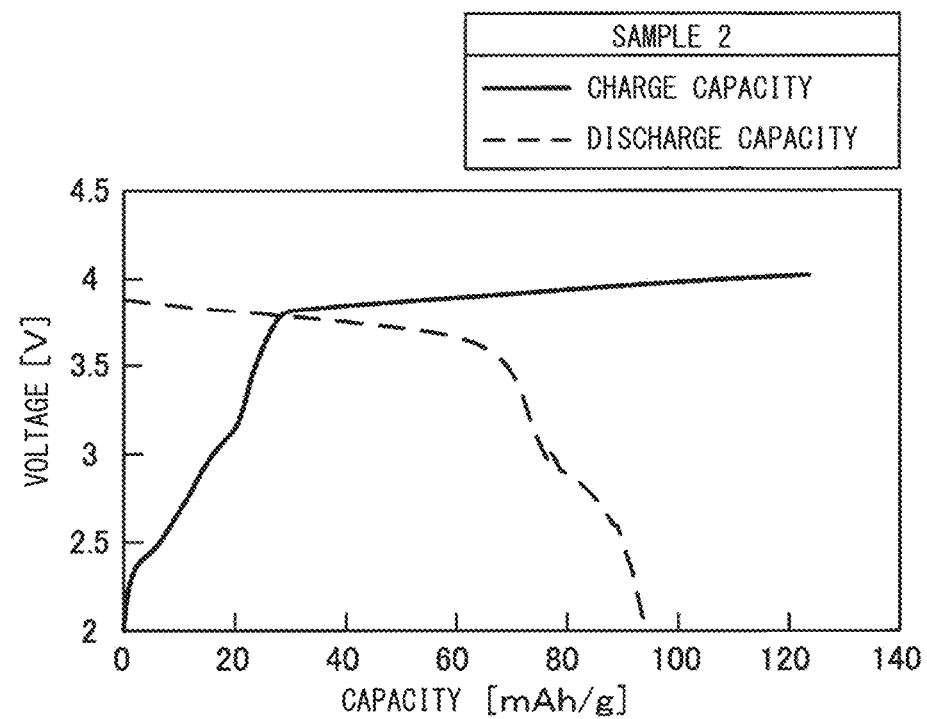
FIG. 5 is a diagram showing a charge/discharge curve of Sample 2 in the experimental examples.
Figure 6:
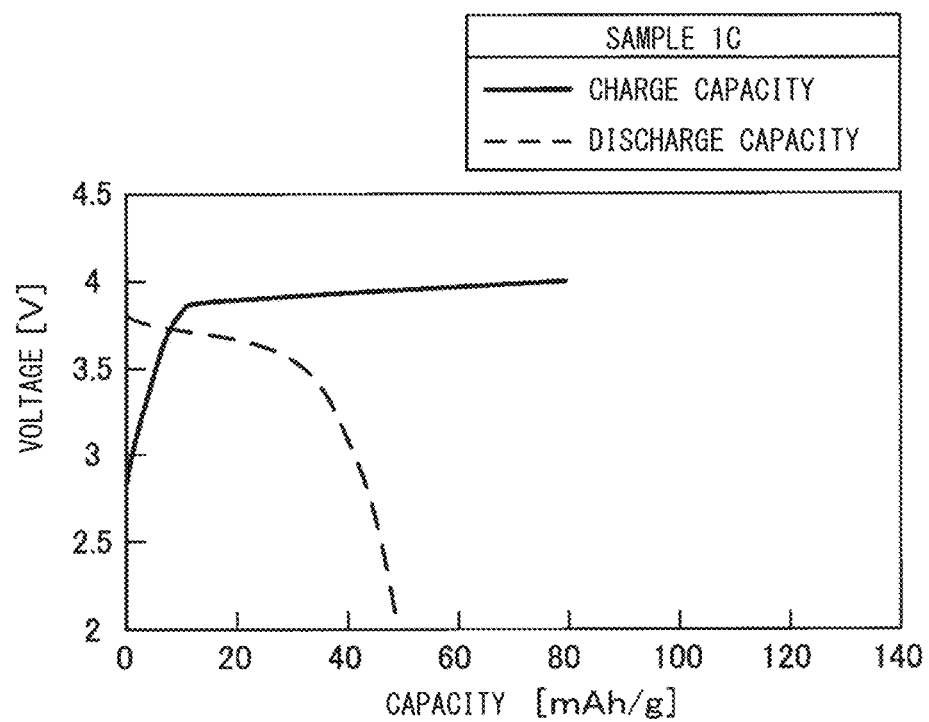
FIG. 6 is a diagram showing a charge/discharge curve of Sample 1C in the experimental examples.

Comparing FIGS. 4, 5 and 6, a plateau not found in the positive electrode active material $LiCoO_2$ was confirmed between about 2.5 V and about 3 V in Sample 1 and Sample 2, and it can be seen that this improves the charge/discharge capacity of the solid-state battery. It is presumed that this is because $Li^+$ was easily absorbed and released due to the formation of the Li—Bi-M2-O-based compound. In addition, it is considered that Bi is trivalent or pentavalent (a crystalline or amorphous portion having a composition close to that of $LiBiO_2$ or $LiBiO_3$ is formed), and it is expected that since divalent M2 (Ca in this example) enters that portion, the charge compensation relationship is broken, and $Li^+$ is easily absorbed and released.

Further, comparing Sample 1 and Sample 2, since $Li_3BO_3$ was used as the sintering aid in Sample 2, a Li-M2-B—O-based compound (Li—Ca—B—O-based compound in this example) was produced as the third phase in addition to the Li-M2-B—O-based compound. Therefore, Sample 2 could improve the density of the positive electrode layer and the conductivity of the positive electrode layer even when sintered at a lower temperature than Sample 1, and as a result, the charge/discharge capacity of the all-solid-state battery was also improved. This is because the third phase contains the Li—Bi-M2-O-based compound and the Li-M2-B—O-based compound, so that the sintering of the positive electrode layer 21 could proceed at a lower temperature.

<Discussion 2>

Figure 7A:
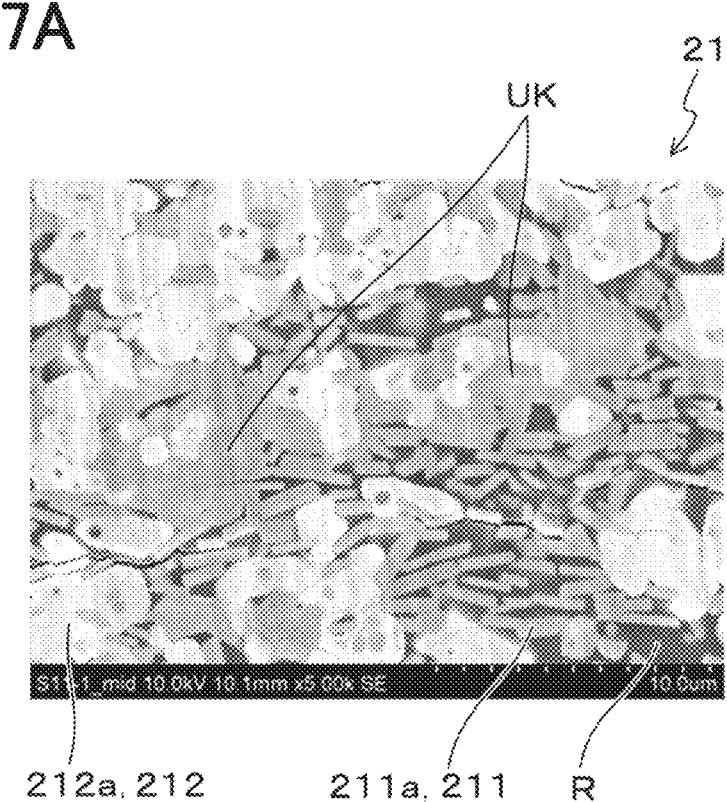
FIG. 7A is a secondary electron image of a cross sectional portion of a positive electrode layer of Sample 1 by a scanning electron microscope (SEM)
Figure 7B:
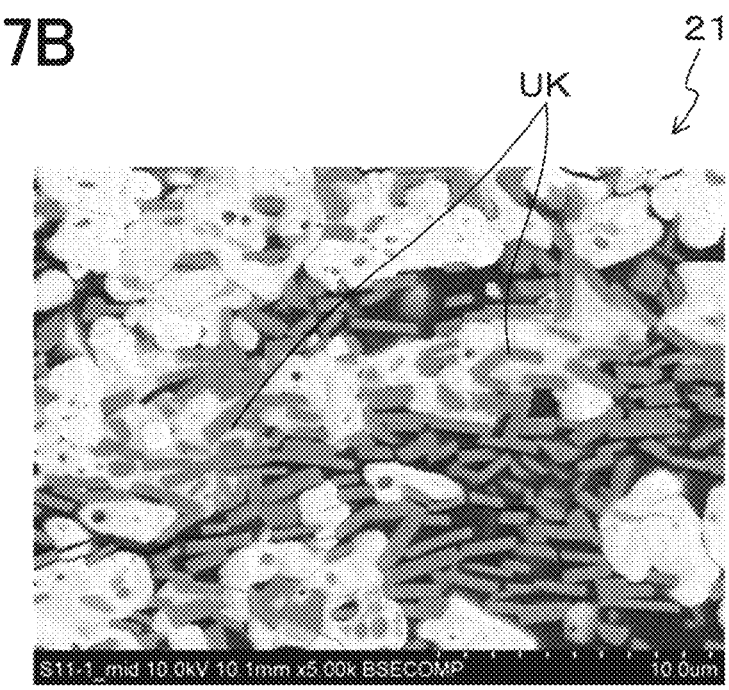
FIG. 7B is a reflected electron image of the cross sectional portion of the positive electrode layer of Sample 1 by the SEM.
Figure 8A:
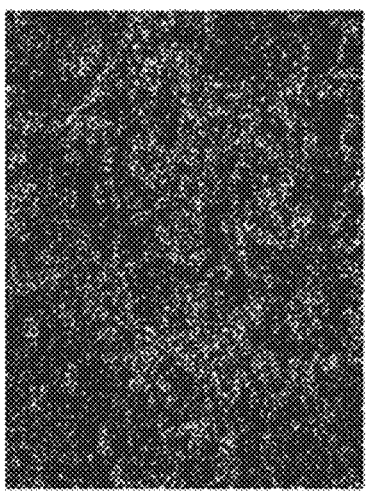
FIG. 8A to FIG. 8F are an electron micrograph and element mapping diagrams by an energy dispersive X-ray spectroscopy (EDX) analysis of the cross-sectional portion of the positive electrode layer of Sample 1.
Figure 8B:
Figure 8C:
Figure 8D:
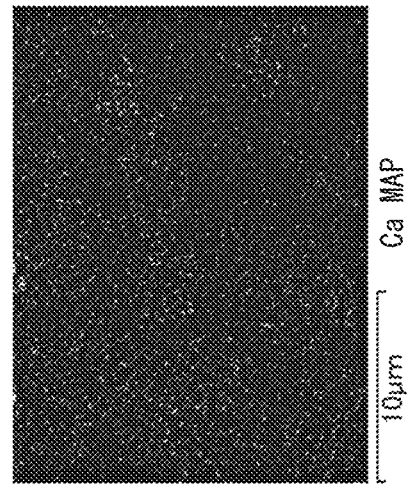
Figure 8E:
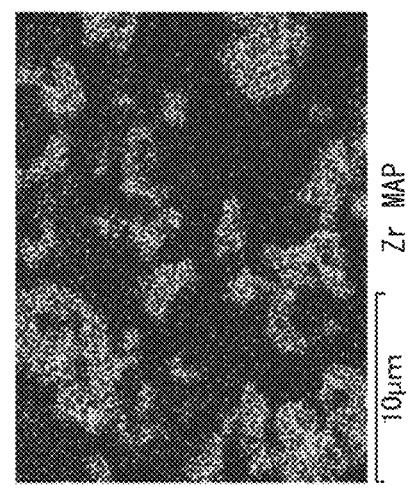
Figure 8F:
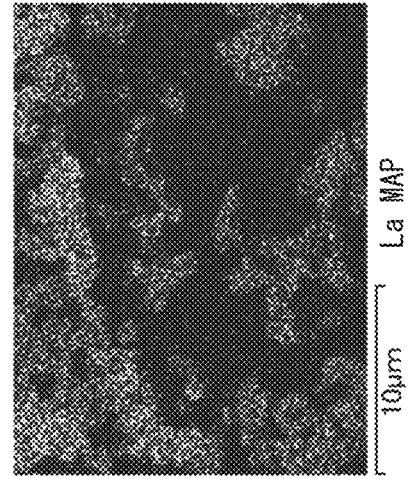
Figure 10A:
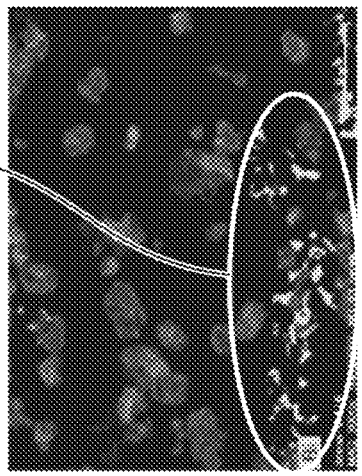
FIG. 10A to FIG. 10F are a SEM image and element mapping diagrams by the EDX analysis of a cross sectional portion of the positive electrode layer of Sample 2.
Figure 10B:
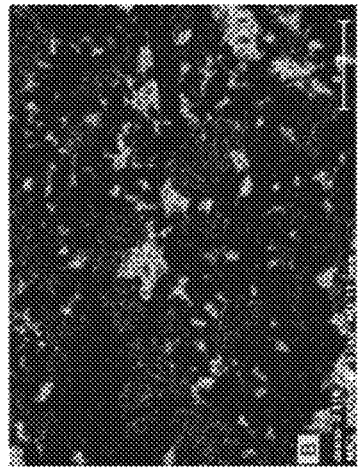
Figure 10C:
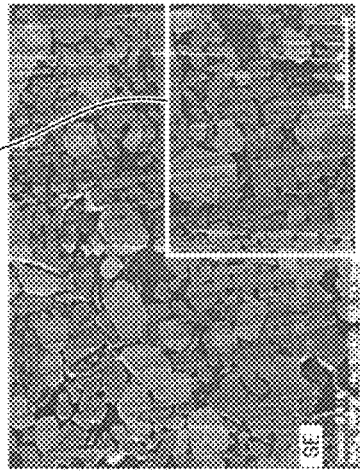
Figure 10D:
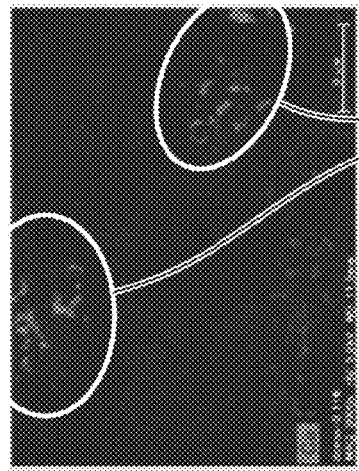
Figure 10E:
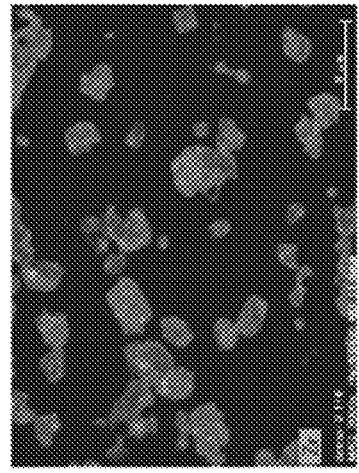
Figure 10F:
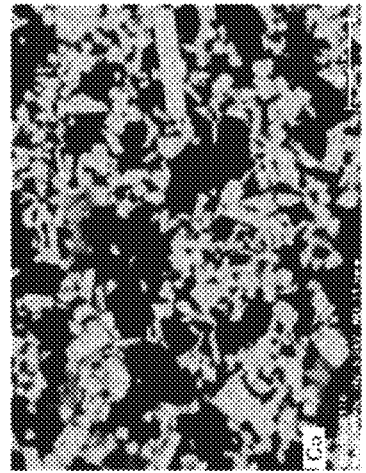
Figure 11:
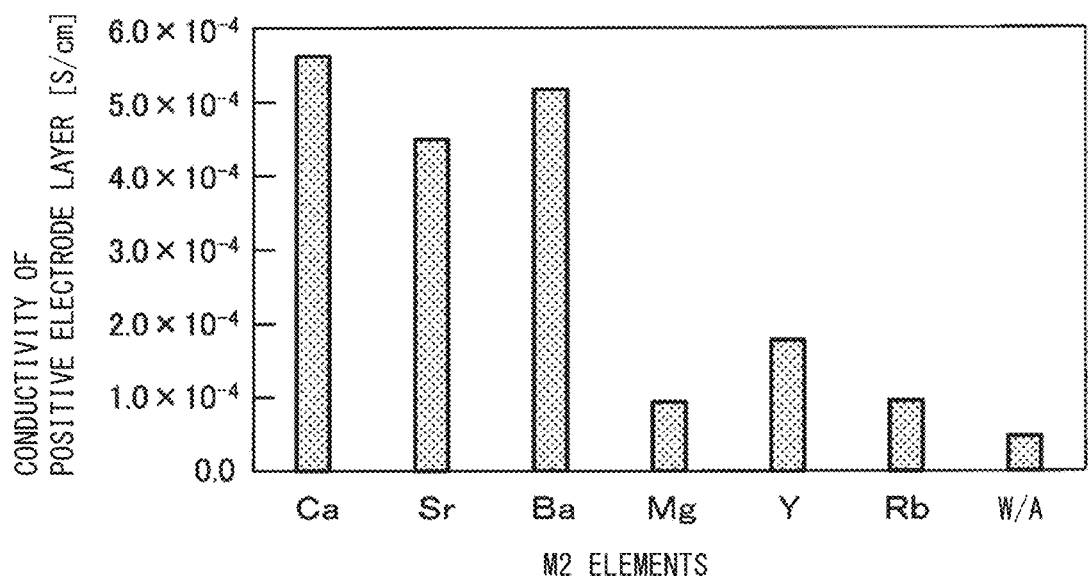
FIG. 11 is a graph showing a relationship between a type of M2 element in a solid electrolyte of a second phase and a conductivity (S/cm) of a positive electrode layer obtained in the experimental examples.
Figure 12:
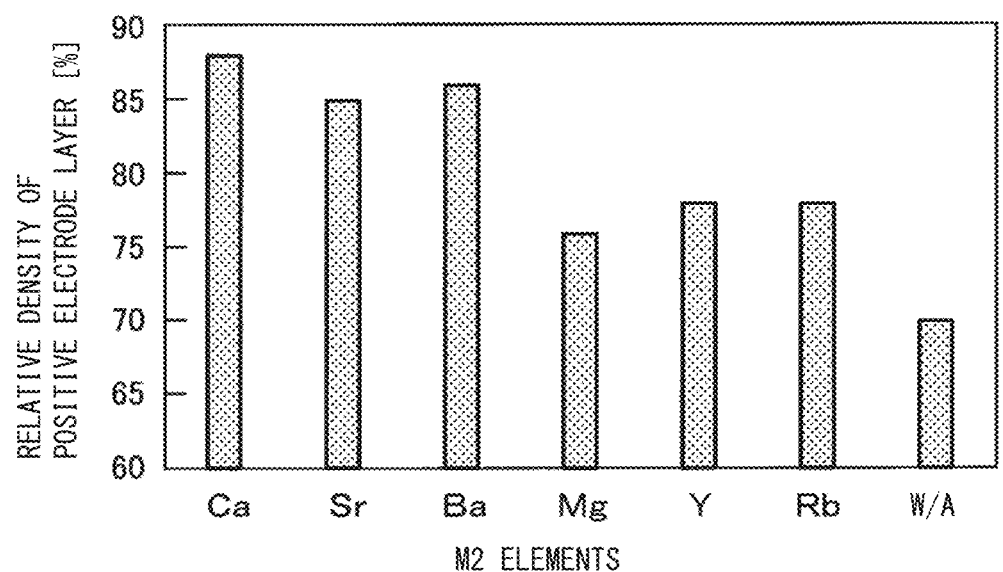
FIG. 12 is a graph showing a relationship between the type of M2 element in the solid electrolyte of the second phase and a relative density (%) of the positive electrode layer obtained in the experimental examples.
Figure 13:
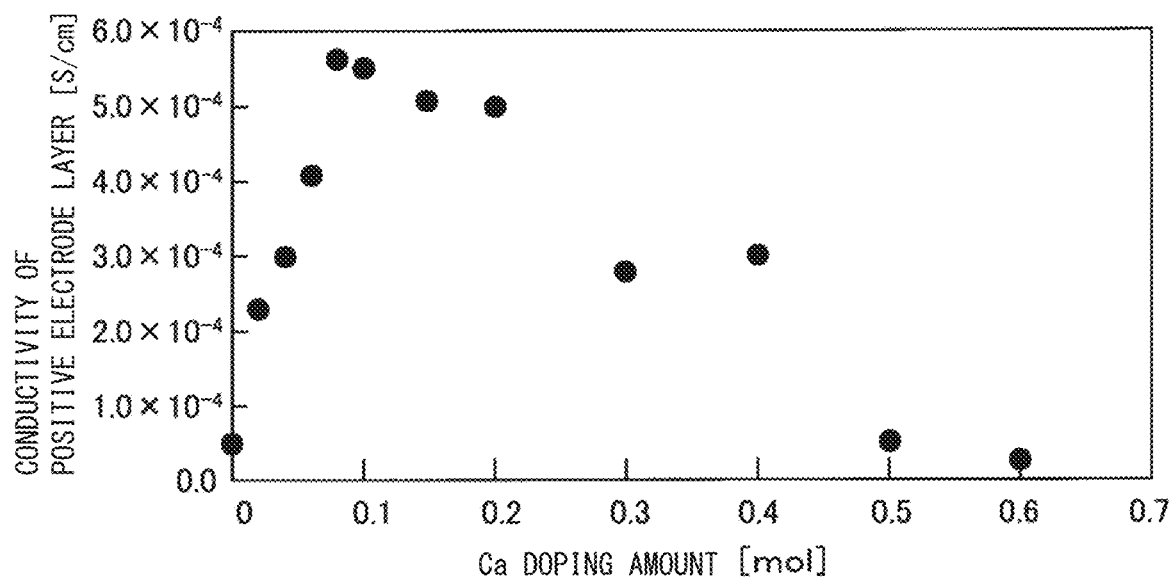
FIG. 13 is a graph showing a relationship between a doping amount (mol) of Ca, which is one of the M2 elements in the solid electrolyte of the second phase, and the conductivity (S/cm) of the positive electrode layer obtained in the experimental examples.
Figure 14:
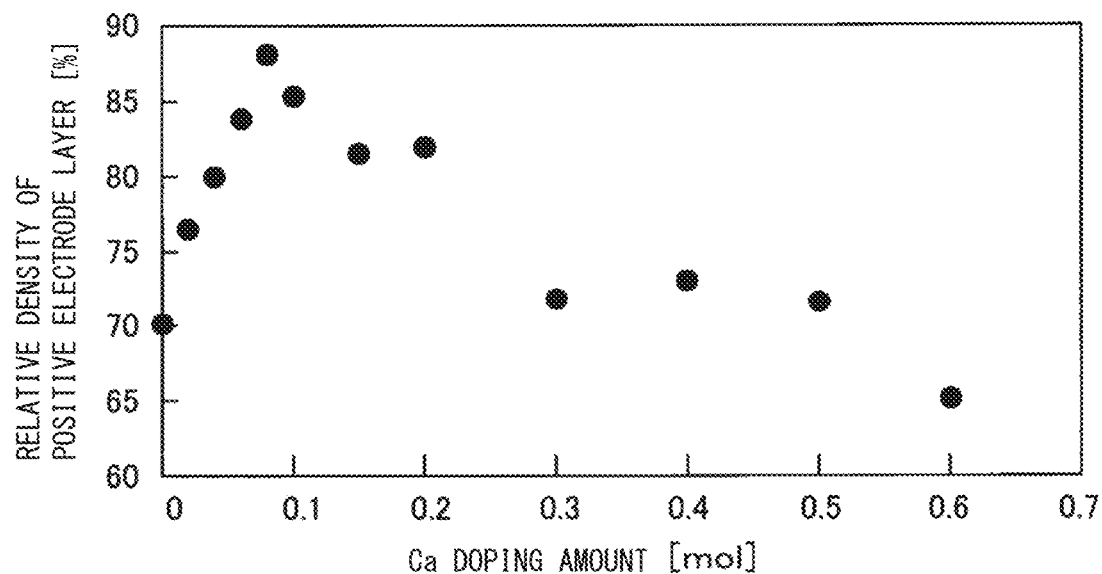
FIG. 14 is a graph showing a relationship between the doping amount (mol) of Ca, which is one of the M2 elements in the solid electrolyte of the second phase, and the relative density (%) of the positive electrode layer obtained in the experimental examples.

According to FIGS. 7A, 7B, 8A to 8F, 9A to 9F, 10A to 10F, and 25, the following can be seen. As shown in FIG. 7A and FIG. 7B, according to the SEM image of the cross section of the positive electrode layer of Sample 1, a portion of the first phase 211 composed of the positive electrode active material 221a of a gray flat particulate, a portion of the second phase 212 composed of the solid electrolyte 212a of white particulate, and a phase UK different from the first phase 211 and the second phase 212 were observed. A portion denoted by symbol R is a resin when the positive electrode layer is embedded in the resin for SEM observation.

As shown in FIGS. 8A to 8F, according to the element mapping diagrams by EDX analysis of the cross-sectional portion of FIG. 7A and FIG. 7B, it was confirmed that the portion of the phase UK different from the first phase 211 and the second phase 212 was a portion in which Bi was more concentrated than the inside of the solid electrolyte 212a, the intensities of Zr and La were weak, and only Ca used as the M2 element was present. Further, although it could not be observed by the above EDX analysis, according to the analysis result by TOF-SIMS shown in FIGS. 9A to 9F, it was confirmed that white arrow portions in FIGS. 9A and 9B were portions in which Bi was rich and Li was also present. Further, it was confirmed that white arrow portions in FIGS. 9D and 9E are portions in which Ca used as the M2 element was rich and Li was also present. From these results, it was confirmed that Li was present in addition to Bi and Ca in the portions of the phase UK different from the first phase 211 and the second phase 212 in FIG. 7A and FIG. 7B. Therefore, it can be seen that the portions of the phase UK in FIG. 7A and FIG. 7B were the third phase 213 different from the first phase 211 and the second phase 212, and included the Li—Bi-M2-O-based compound 213a containing Li, Bi, M2 (Ca in this example), and O. The Li—Bi-M2-O-based compound 213a contained in the third phase 213 becomes a substance that absorbs and releases $Li^+$ between about 2.5 V and about 3 V described in Discussion 1.

As shown in FIGS. 10A to 10F, according to the element mapping diagrams by EDX analysis of the cross-sectional portion of the positive electrode layer of Sample 2 using $Li_3BO_3$ as the sintering aid (in particular, see FIGS. 10B, 10C, and 10F), it can be seen that the Li-M2-B—O-based compound 213b composed of a compound containing Li, M2 (Ca in this example), B, and O was generated in addition to the Li—Bi-M2-O-based compound 213a by using the sintering aid. In the positive electrode layer of Sample 2, sintering proceeded at a lower temperature because the alkaline earth metal has the effect of lowering the melting point of the glass, Ca, which is an M2 element, is mixed in the $Li_3BO_3$ glass from the solid electrolyte 212a, and $Li_3BO_3$ melts at a temperature lower than the melting point of 810° C., and the liquid phase promotes sintering. From this result, it can be said that when the third phase 213 contains the Li-M2-B—O-based compound 213b in addition to the Li—Bi-M2-O-based compound 213a, the density and the conductivity of the positive electrode layer are further improved and it is advantageous to increase the capacity and the output of the all-solid-state battery. Each element map in FIGS. 10B to 10F corresponds to a portion of a white frame X in a SEM image in FIG. 10A.

<Discussion 3>

According to FIGS. 11, 12, 25, and 26, the following can be seen. It can be seen from these figures that when M2 in the composition of the solid electrolyte of the second phase is Ca, Sr, Ba, Mg, Y, or Rb, the positive electrode layer has a higher density and the conductivity of the positive electrode layer is higher than those of Sample 2C not doped with M2 (W/O in FIGS. 11 and 12). In particular, it can be seen that when M2 is Ca, Sr, or Ba, the conductivity and the density of the positive electrode layer 21 can be made higher than when M2 is Mg, Y, or Rb. When M2 is Mg, Y, or Rb, the conductivity and the density of the positive electrode layer can be increased as compared with the case where M2 is not doped. Therefore, it can be said that Mg, Y, and Rb are also useful elements.

<Discussion 4>

According to FIGS. 13, 14, 25, 27, and 28, the following can be seen. It can be seen from these figures that when the doping amount y of M2 (the doping amount of Ca in these examples) in the composition of the solid electrolyte of the second phase satisfies $0<y\leq0.5$, the conductivity and the density of the positive electrode layer can be easily increased as compared with the case where M2 is not doped (when y=0). Therefore, in these cases, it can be said that it becomes easy to increase the capacity and the output of the all-solid-state battery.

<Discussion 5>

Figure 15:
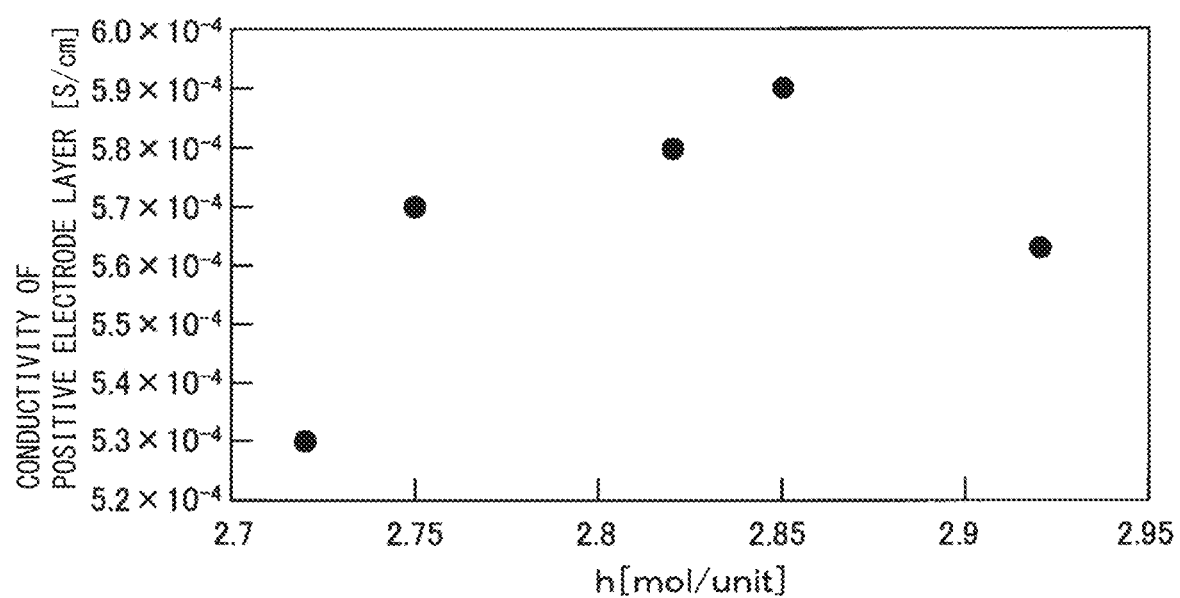
FIG. 15 is a graph showing a relationship between an La amount h (mol/unit) in the solid electrolyte of the second phase and the conductivity (S/cm) of the positive electrode layer obtained in the experimental examples.
Figure 16:
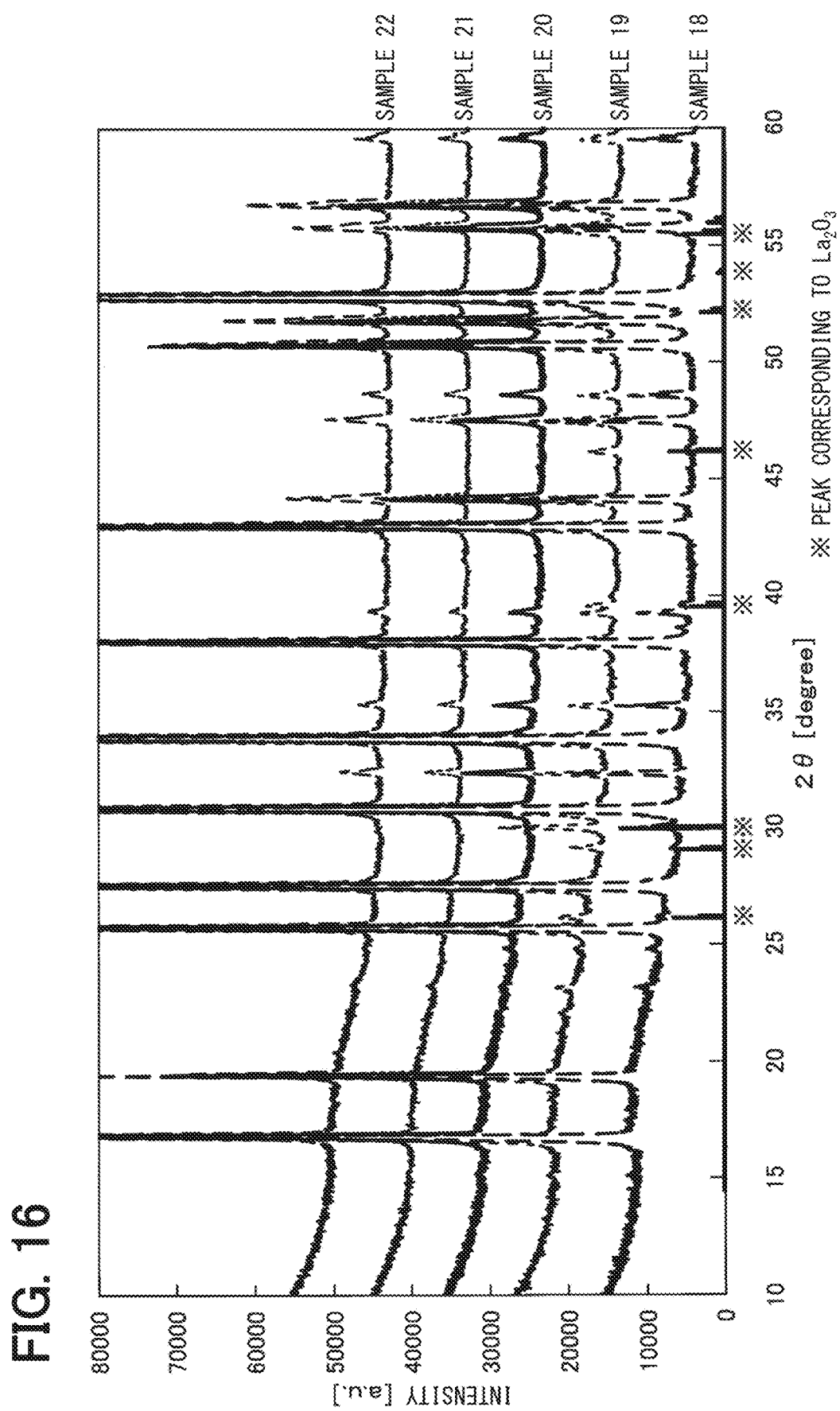
FIG. 16 is a diagram showing X-ray diffraction (XRD) patterns of Samples 18 to 22 having different values of La amount h in the solid electrolyte of the second phase obtained in the experimental examples together with peaks corresponding to $La_2O_3$.

According to FIGS. 15, 16, 17, and 29, the following can be seen. As shown in FIG. 29, Sample 18 has a La amount h=2.92 (=3−y) in the composition of the solid electrolyte of the second phase and is in a stoichiometric composition. On the other hand, in Samples 19 to 21, the value of La amount h is smaller than that in the case of the stoichiometric composition. Specifically, each of Samples 19 to 21 has a La amount h satisfying $3-y-0.2<h<3-y$. As shown in FIGS. 15 and 29, Samples 19 to 21 satisfying $3-y-0.2<h<3-y$ have higher ionic conduction in the positive electrode layer than Sample 18 in which h=3−y. This is because, as shown in FIG. 16, in Samples 19 to 21, it was more difficult for the impurity phase of $La_2O_3$, which is a resistance component, to be formed in the positive electrode layer than in Sample 18. Further, it is presumed that, in Sample 18 in which h=3−y, a relatively large amount of impurity phase was generated because La, which has a heavy element weight and slow diffusion among the constituent elements in the solid electrolyte of the second phase was unreacted with the constituent elements and was likely to remain.

Figure 17:
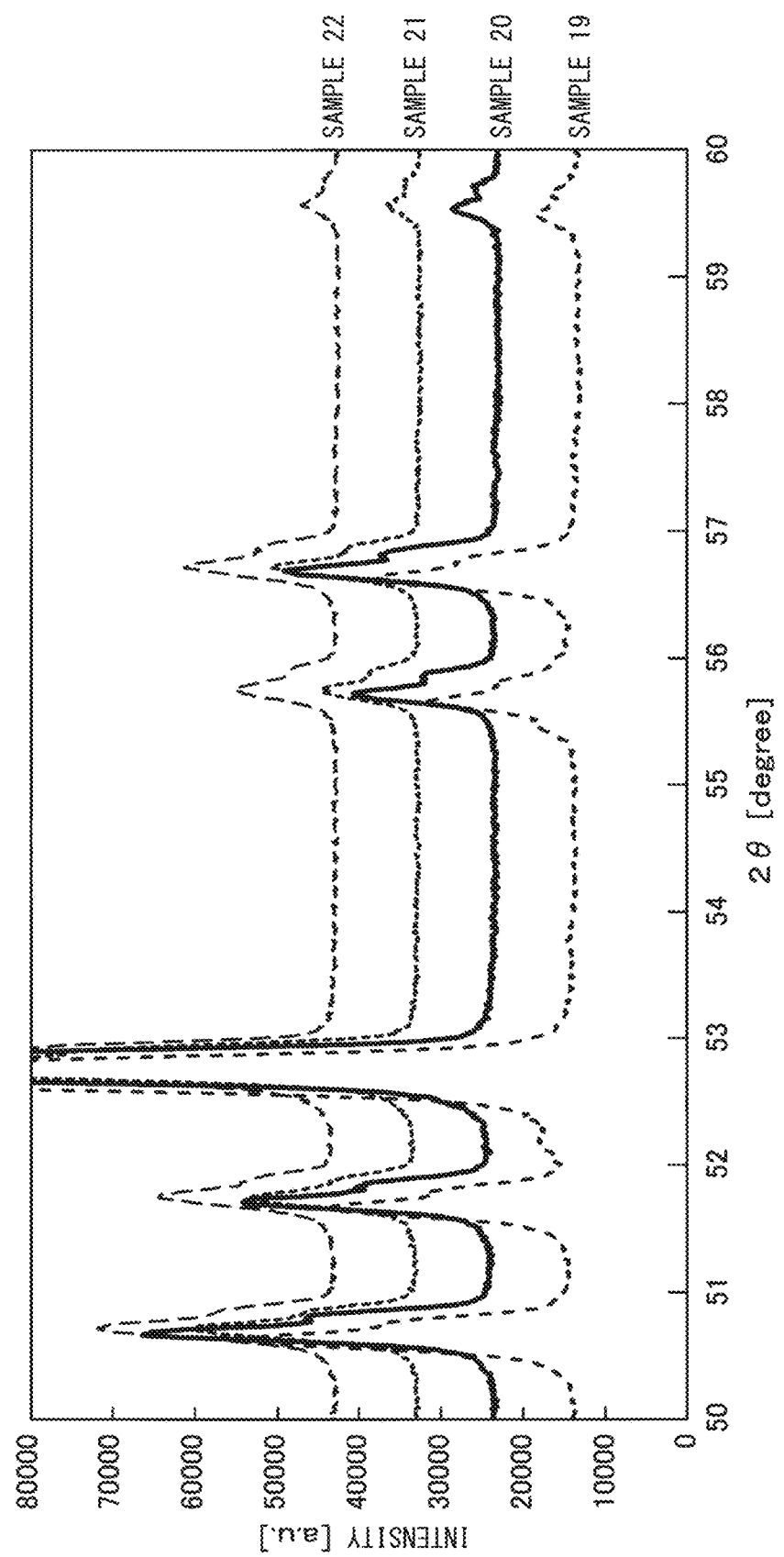
FIG. 17 is an enlarged view of the XRD patterns in a range of 2θ=50 to 60 (degrees) in FIG. 16.

Further, it can be seen that when the La amount h is made smaller than the La amount h=3−y in the stoichiometric composition, as shown in FIG. 17, the peak in the XRD pattern shifts to the high angle side. This is because the lattice constant becomes smaller due to the reduction of $La^{3+}$ (1.16 Å) having a large ionic radius among the LLZ-based composite oxides. Since it is easier for ions to pass through when the lattice constant increases, it is considered that if La is excessively reduced, the ionic conductivity decreases. From this point of view, it can be said that the La amount h preferably satisfies $3-y-0.2<h$.

<Discussion 6>

According to FIGS. 18, 19, 20, 21, and 30, the following can be seen. As shown in FIG. 30, when Sample 23 and Sample 24 are compared, Sample 24 in which M1 is Ga in the composition of the solid electrolyte of the second phase had a higher conductivity of the positive electrode layer and a higher relative density of the positive electrode layer than sample 23 in which M1 is Al. From this result, it can be seen that by setting M1 to Ga, it becomes easier to increase the capacity and the output of the all-solid-state battery as compared with the case where M1 is Al.

Figure 18:
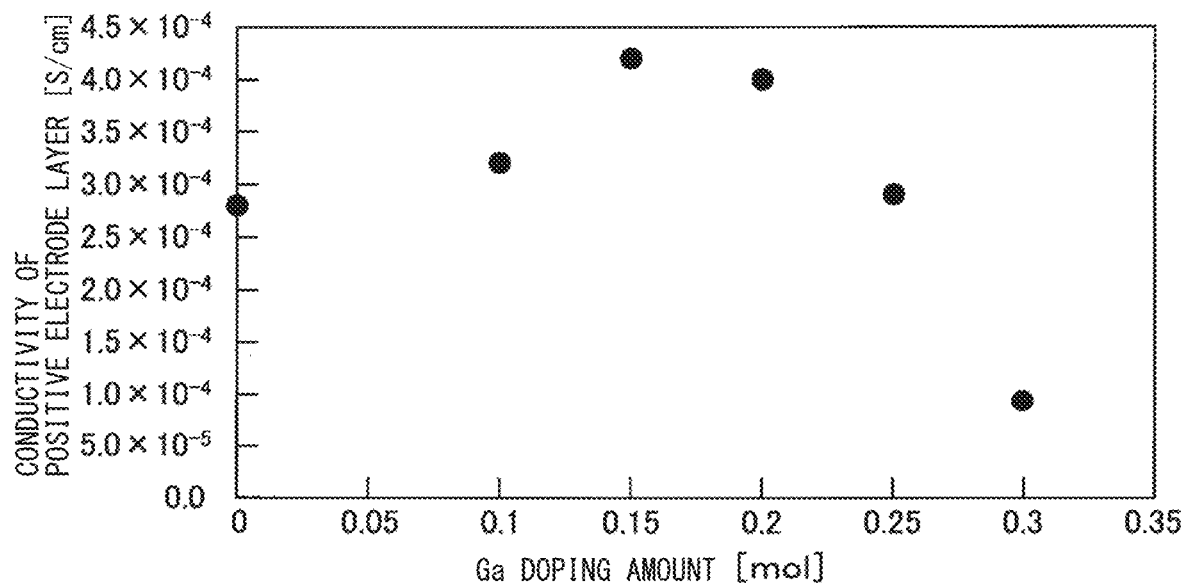
FIG. 18 is a graph showing a relationship between a doping amount (mol) of Ga, which is one of M1 elements in the solid electrolyte of the second phase, and the conductivity (S/cm) of the positive electrode layer obtained in the experimental examples.
Figure 19:
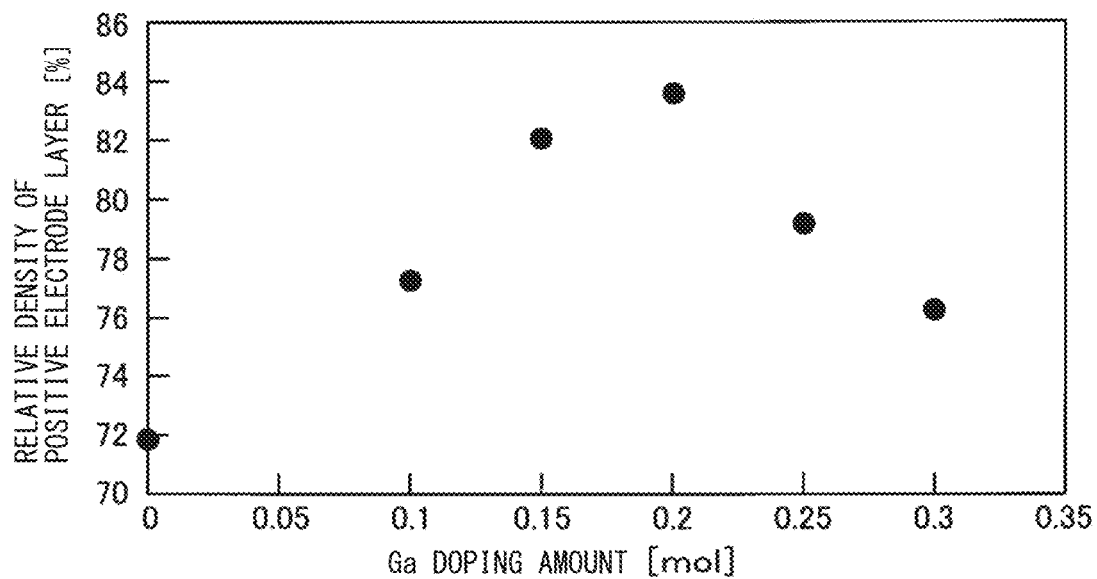
FIG. 19 is a graph showing a relationship between the doping amount (mol) of Ga, which is one of the M1 elements in the solid electrolyte of the second phase, and the relative density (%) of the positive electrode layer obtained in the experimental examples.

Further, it can be seen from FIGS. 18, 19, and 30 that when the M1 doping amount (Ga doping amount in these examples) x satisfies 0.05≤x≤0.25, it is easy to increase the conductivity and the density of the positive electrode layer, and it is easy to increase the capacity and the output of the all-solid-state battery as compared with the case where=0 (see Sample 14).

Figure 20:
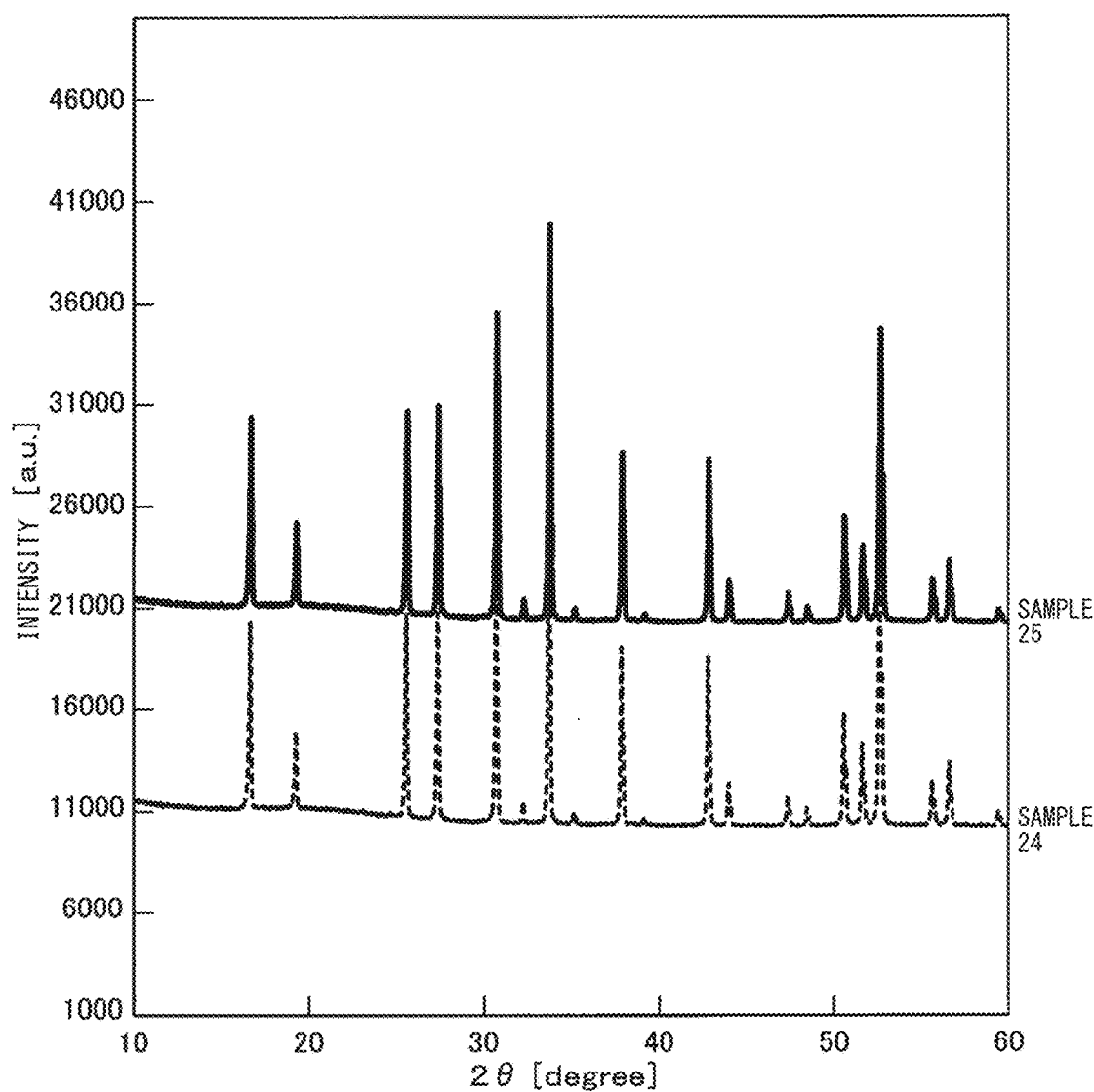
FIG. 20 is a diagram showing XRD patterns of Sample 24 and Sample 25 having different doping amounts of Ga, which is one of the M1 elements in the solid electrolyte of the second phase, obtained in the experimental examples.
Figure 21:
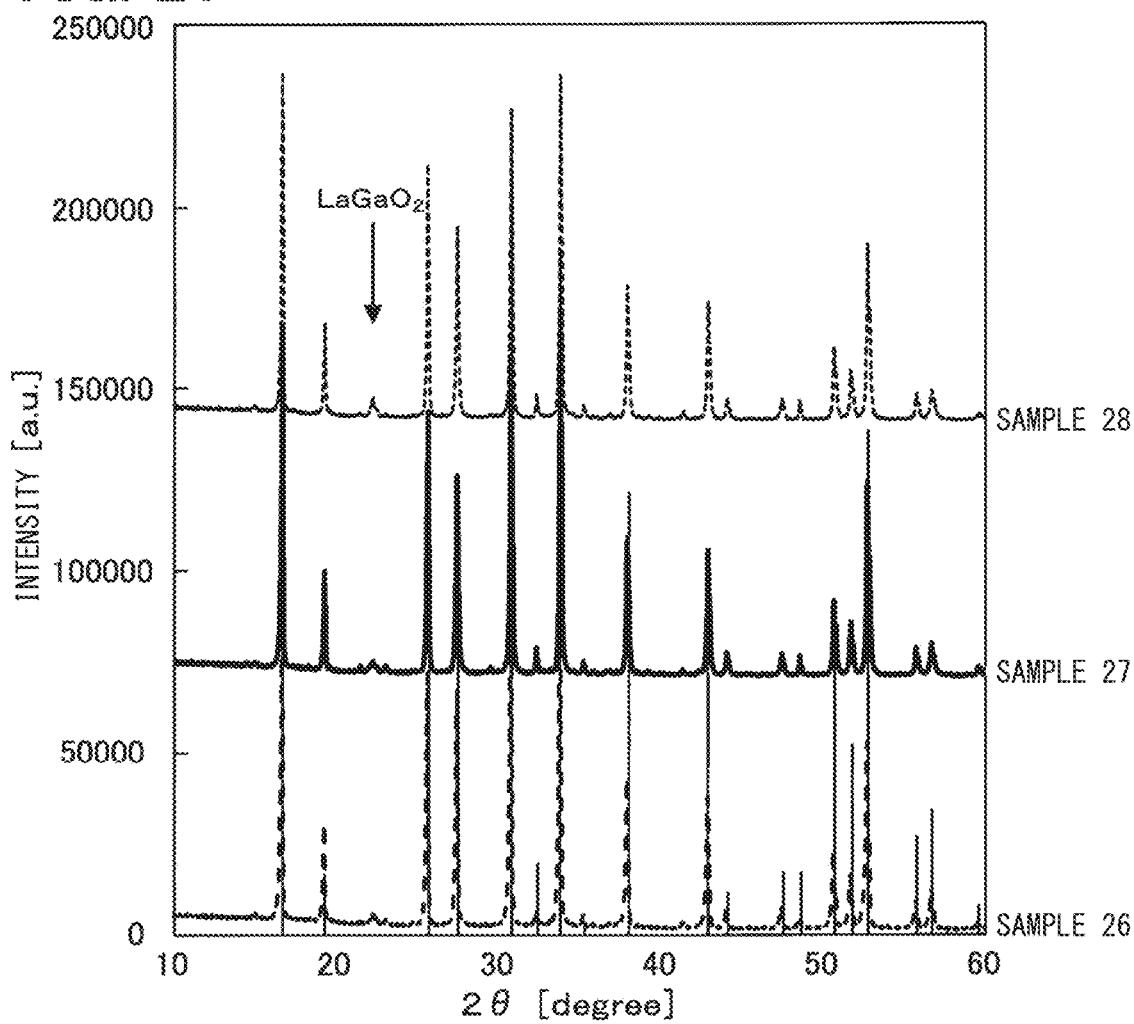
FIG. 21 is a diagram showing XRD patterns of Sample 26, Sample 27, and Sample 28 having different doping amounts of Ga, which is one of the M1 elements in the solid electrolyte of the second phase, obtained in the experimental examples.
Figure 22:
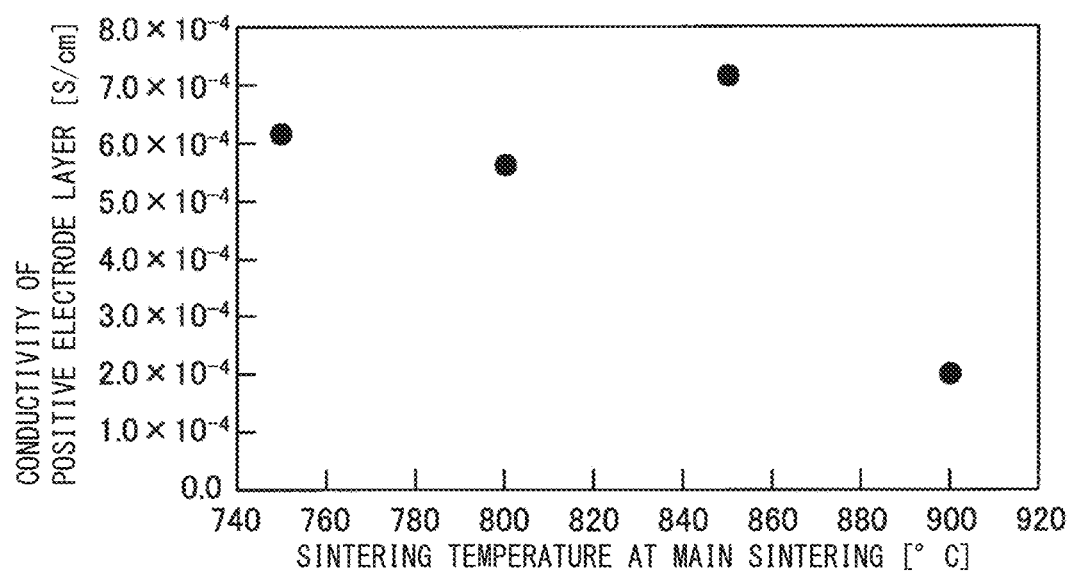
FIG. 22 is a graph showing a relationship between a sintering temperature (° C.) of a positive electrode layer forming material at a main firing and the conductivity (S/cm) of the positive electrode layer obtained in the experimental examples.

Further, it can be seen from FIGS. 20 and 21 that when the M1 doping amount x becomes larger than 0.3, the impurity phase of the insulating $LaGaO_2$ begins to be formed, and the conductivity of the positive electrode layer tends to decrease. Therefore, it can be said that the M1 doping amount x is preferably 0.3 or less.

<Discussion 7>

Figure 23A:
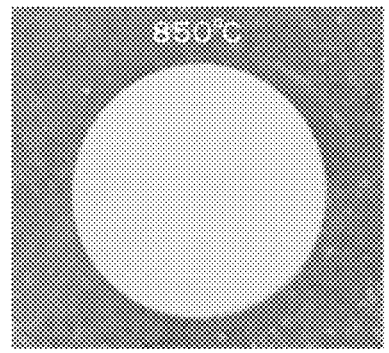
FIG. 23A is an appearance photograph of a solid electrolyte powder used for preparing a positive electrode layer of Sample 30 when sintered at 850° C.
Figure 23B:
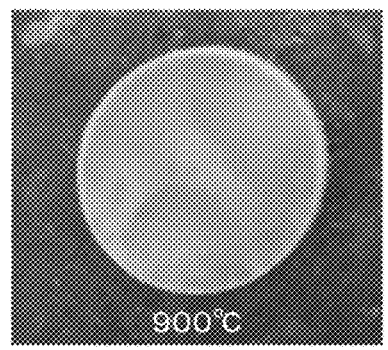
FIG. 23B is an appearance photograph of a solid electrolyte powder used for preparing a positive electrode layer of Sample 31 when sintered at 900° C.
Figure 24:
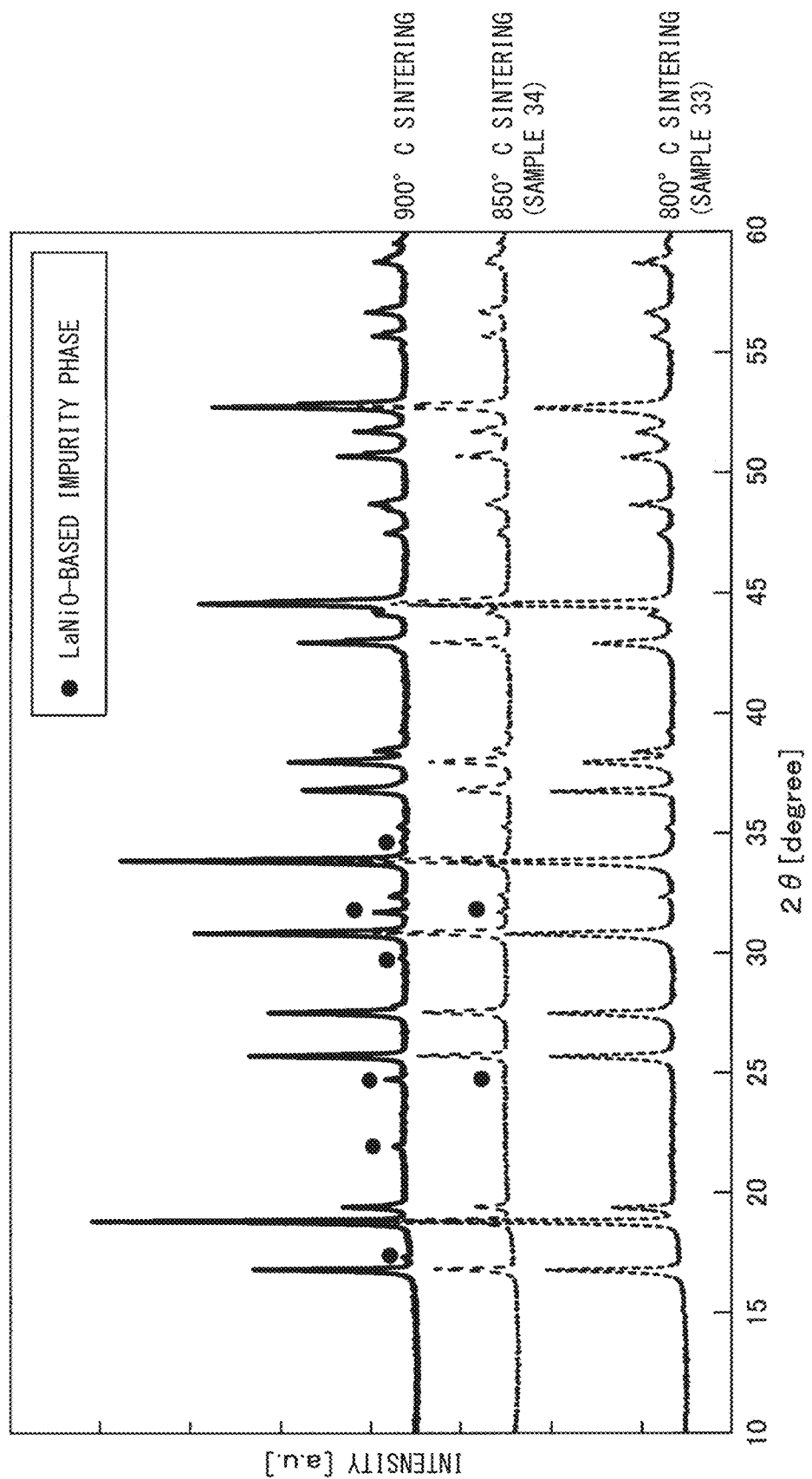
FIG. 24 is a diagram showing XRD patterns of Sample 33 sintered at 800° C., Sample 34 sintered at 850° C., and a sample sintered at 900° C. obtained in the experimental examples.

According to FIGS. 22, 23, 24, and 31, the following can be seen. According to FIGS. 22 and 31, it can be seen that when the sintering temperature of the positive electrode layer forming material at the time of main firing is less than 900° C., the conductivity of the positive electrode layer can be maintained high. On the other hand, it can be seen that when the sintering temperature of the positive electrode layer forming material at the time of main firing is 900° C. or higher, the conductivity of the positive electrode layer is remarkably lowered. This is because, as shown in FIG. 23, discoloration of the solid electrolyte of the sample is observed at the sintering temperature of 900° C., so that a part of the solid electrolyte containing Li, Bi, M2, and O is decomposed, and the solid electrolyte is partially decomposed. As shown in FIGS. 24 and 31, when a positive electrode active material composed of lithium nickel manganese cobalt oxide is used and fired at 900° C., a LaNiO-based impurity phase was generated by the reaction between the positive electrode active material and the solid electrolyte, the resistance became high, and the conductivity of the positive electrode layer and the charge/discharge capacity of the all-solid-state battery could not be measured (N/A). From this, it can be said that when a positive electrode active material composed of lithium nickel manganese cobalt oxide is used, it is preferable to sinter at 800° C. or lower.

The present disclosure is not limited to each of the above-described embodiments and experimental examples, and various modifications can be made without departing from the gist thereof. In addition, each configuration shown in each embodiment and each experimental example can be optionally combined.

Hereinafter, modification of the present disclosure will be described. Each modification can be optionally combined with each configuration shown in each embodiment, and each experimental example.

A positive electrode for an all-solid-state battery according to a modification includes a first phase including a positive electrode active material containing Li, a second phase including a garnet-type solid electrolyte containing Li, Bi, M2, and O, and a third phase different from the first phase and the second phase. In the positive electrode, a battery capacity not found in the first phase is expressed when the positive electrode is used in an all-solid-state battery and the all-solid-state battery is charged and discharged, and M2 is at least one element selected from the group consisting of Ca, Sr, Ba, Mg, Y, and Rb. According to this configuration, the charge/discharge capacity of the all-solid-state battery can be improved by expression of the battery capacity that is not found in the first phase.

In a positive electrode for an all-solid-state battery according to another modification, the third phase includes a Li—Bi-M2-O-based compound containing Li, Bi, M2, and O. The Li—Bi-M2-O-based compound can absorb and release Li at around 3V. Therefore, according to this configuration, it is possible to ensure the improvement of the charge/discharge capacity of the all-solid-state battery. In addition, the Li—Bi-M2-O-based compound promotes the progress of sintering of the positive electrode layer. Therefore, according to this configuration, the amount of the positive electrode active material in contact with the interface between the positive electrode active material and the solid electrolyte increases, and it is possible to increase the capacity and the output of the all-solid-state battery.

What is claimed is:

1. A positive electrode layer for an all-solid-state battery, comprising:
    a first phase including a positive electrode active material containing Li;
    a second phase including a garnet-type solid electrolyte containing Li, Bi, M2, and O; and
    a third phase including a compound containing Li, Bi, M2, and O and a compound containing Li, M2, B, and O, wherein
    the first phase, the second phase, and the third phase have different compositions from each other, and
    the garnet-type solid electrolyte has a composition of $Li_{7-3x+\alpha y-z+\beta g}(M1)_x La_h(M2)_y Zr_{2-z-g}(Bi)_z(M3)_g O_{12\pm\delta}$, 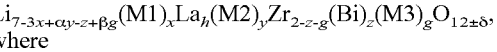
    where
    M1 is Al or Ga,
    M2 is at least one element selected from the group consisting of Ca, Sr, Ba, Mg, Y, and Rb,
    M3 is at least one element selected from the group consisting of Ta, Nb, Ge, Te, Sc, Sb, and Hf,
    α satisfies 0≤α≤2 depending on a valence of M2,
    β satisfies −2≤β≤1 depending on a valence of M3,
    0≤x≤0.4, 0<y≤2.8, 0<z≤2, 0≤g<2, 3−y−0.2<h≤3−y, 2−z−g≥0, and
    δ is an indefinite amount of oxygen.

2. The positive electrode layer according to claim 1, wherein M2 is at least one element selected from the group consisting of Ca, Sr, and Ba.

3. The positive electrode layer according to claim 1, wherein h and y satisfy 3−y−0.2<h<3−y.

4. The positive electrode layer according to claim 1, wherein M1 is Ga.

5. The positive electrode layer according to claim 1, wherein x satisfies 0.05≤x≤0.25.

6. An all-solid-state battery comprising a positive electrode layer that includes:
    a first phase including a positive electrode active material containing Li;
    a second phase including a garnet-type solid electrolyte containing Li, Bi, M2, and O; and
    a third phase including a compound containing Li, Bi, M2, and O and a compound containing Li, M2, B, and O, wherein
    the first phase, the second phase, and the third phase have different compositions from each other, and
    the garnet-type solid electrolyte has a composition of $Li_{7-3x+\alpha y-z+\beta g}(M1)_x La_h(M2)_y Zr_{2-z-g}(Bi)_z(M3)_g O_{12\pm\delta}$, 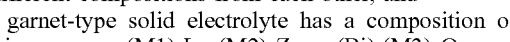
    where
    M1 is Al or Ga,
    M2 is at least one element selected from the group consisting of Ca, Sr, Ba, Mg, Y, and Rb, M3 is at least one element selected from the group consisting of Ta, Nb, Ge, Te, Sc, Sb, and Hf, α satisfies $0 \leq \alpha \leq 2$ depending on a valence of M2, β satisfies $-2 \leq \beta \leq 1$ depending on a valence of M3, $0 \leq x \leq 0.4$, $0 < y \leq 2.8$, $0 < z \leq 2$, $0 \leq g < 2$, $3-y-0.2 < h \leq 3-y$, $2-z-g \geq 0$, and δ is an indefinite amount of oxygen.

7. The positive electrode layer according to claim 1, wherein $0 < z \leq 1.8$ and $0 \leq g \leq 0.15$.

8. The positive electrode layer according to claim 1, wherein an electric capacity of the third phase is lower than an electric capacity of the positive electrode active material, an electric resistance of the third phase is larger than an electric resistance of the garnet-type solid electrolyte, and an area ratio of the third phase to an entire cross section of the positive electrode layer is smaller than an area ratio of the first phase to the entire cross section the positive electrode layer, and an area ratio of the second phase to the entire cross section of the positive electrode layer.

\* \* \* \* \*